United States Patent [19]

Moshfegh

[11] Patent Number: 5,329,442
[45] Date of Patent: Jul. 12, 1994

[54] OPTIMAL DISTRIBUTED CONTROL SYSTEM FOR A LINEAR DISTRIBUTED PARAMETER SYSTEM

[75] Inventor: Allen Moshfegh, Great Falls, Va.

[73] Assignee: The United States of America as represented by the Secretary of the Navy, Washington, D.C.

[21] Appl. No.: 751,939

[22] Filed: Aug. 29, 1991

[51] Int. Cl.$^5$ .............................................. G06F 15/31
[52] U.S. Cl. .................................... 364/149; 364/150
[58] Field of Search ............... 364/148, 149, 164, 150, 364/153, 180, 508

[56] References Cited

U.S. PATENT DOCUMENTS

| | | | |
|---|---|---|---|
| 4,057,708 | 10/1977 | Greeley | 364/423 X |
| 4,770,841 | 9/1988 | Haley et al. | 976/DIG. 296 X |
| 5,019,958 | 5/1991 | Varga et al. | 318/615 X |
| 5,038,616 | 8/1991 | Schneider et al. | 364/508 X |
| 5,057,992 | 10/1991 | Traiger | 364/148 |
| 5,082,421 | 1/1992 | Acton et al. | 415/119 X |
| 5,144,549 | 9/1992 | Youcef-Toumi | 364/148 |

*Primary Examiner*—Jerry Smith
*Assistant Examiner*—Brian C. Oakes
*Attorney, Agent, or Firm*—William C. Townsend; Kenneth W. Dobyns

[57] ABSTRACT

An optimal control system for canceling the undesired responses of a linear distributed-parameter system in response to an input stimulus. The control system is optimally distributed and its design is based on the extension of the Pontryagin's maximum principle for a lumped-parameter system to a distributed-parameter system. The technique is to transform the stimulus-to-undesired-output transfer function of the distributed-parameter system into a multidimensional discrete state-space model, and to require a performance criterion to be defined. Theorems have been established to give conditions for asymptotic stability of the closed-loop distributed-parameter system, and to set up weighting factors for the performance criterion. An optimal distributed-control system can force the states of the distributed system to behave according to the prescribed performance criterion regardless of the boundary and initial conditions. The optimal control law can be implemented either as a state-feedback or an output-feedback controller.

9 Claims, 10 Drawing Sheets

$\alpha_1 = 4a_1 - 2a_3\Delta x - 2a_2\Delta t - a_4\Delta t\Delta x$ $\alpha_1 = -4a_1 + 2a_3\Delta x - 2a_2\Delta t - a_4\Delta t\Delta x$ $\alpha_1 = -4a_1 - 2a_3\Delta x + 2a_2\Delta t - a_4\Delta t\Delta x$ $\alpha_1 = 4a_1 + 2a_3\Delta x + 2a_2\Delta t - a_4\Delta t\Delta x$

OPTIMAL DISTRIBUTED CONTROL SYSTEM FOR A LINEAR DISTRIBUTED PARAMETER SYSTEM

BACKGROUND OF THE INVENTION

1. Field of the Invention

The invention relates to control systems directed by digital computers, and more particularly to a control system for use in connection with a physical system. The physical system responds to an input stimulus by generating an undesired output which affects a physical body, in addition to its desired outputs. The distributed control system generates a state-space model of the transfer function between stimulus and undesired output and, using optimizing procedures which use a set of optimal control gains, generates a derived output from that space-state model which approximates the undesired output for a given stimulus. The control system then supplies the derived output to a transducer which applies a transducer output to the physical body to cancel the undesired output.

2. Description of the Prior Art

A number of modeling procedures have been developed in the prior art to control the dynamics of a continuous distributed-parameter system in convenient forms. These include a first-order system of partial differential or difference equations method proposed by Wang and Tung in 1964, in a paper entitled "Optimum Control of Distributed-parameter Systems", in Journal of Basic Engineering, Trans. ASME, pages 67–78; a separation method proposed by Meirovitch in 1967 in a book entitled "Analytical Methods in Vibrations (New York: The Macmillan Co.), and by Meirovitch and Silverberg in 1983 in a paper entitled "Globally Optimal Control of Self-adjoint Distributed Systems", in Optimal Control Applications and Methods, Vol. 4, pages 365–386; and a multidimensional state-space method proposed in various forms by Attasi in 1973 in a paper entitled "Systems Lineaires Homogenes a Deux Indices", in IRIA Rapport Laboria, No. 31; by Roesser in 1975 in a paper entitled "A Discrete Space-State Model for Linear Image Processing", in IEEE Transactions on Automatic Control, Vol. AC-20, No. 1, pages 1–10; by Fornasini and Marchesini in 1978 in a paper entitled "Doubly-Indexed Dynamical Systems: State-space Models and Structural Properties", in Math. Systems Theory, pages 59–72; and by Kaczorek in 1985, in a book entitled Two-dimensional Linear Systems (Heidelberg, Germany: Springer-Verlag). I have also done work in this area in my doctoral thesis, made publicly available less than a year prior to the filing date of this application, entitled Multidimensional Discrete State-space Modeling Optimal Control and Tracking of The Linear Distributed-parameter Systems, D.Sc. Dissertation, School of Engineering and Applied Science, George Washington University, Washington, D.C.

This application discloses a control system for controlling the dynamics of a distributed-parameter system in an optimum manner. Many researchers have developed techniques to manipulate the dynamic characteristics of the distributed-parameter systems. These include Wang and Tung in the work cited above; Paraskevopoulos in 1979, in an article entitled Eigenvalues Assignment of Linear Multivariable Two-dimensional Systems, in Proceedings of the IEEE, Vol. 126, pages 1204–1208; Paraskevopoulos and Kosmidou in 1981, in an article entitled Eigenvalue Assignment of Two-dimensional Systems Using PID Controllers", in International Journal of Systems Science, Vol. 12, No. 4, pages 407–422, and Tzafestas and Pimenides in 1983, in a paper entitled "Feedback Characteristic Polynomial Controller Design of 3-D Systems in State-space", from the Control System Laboratory, School of Engineering, University of Patras, Patras, Greece, Vol. 314, No. 3, pages 169–189. Paraskevopoulos et al presented a method to reassign the poles of a two-dimensional system to a set of desired values using a static state-feedback or static output feedback controller, Paraskevopoulos et al developed a multidimensional proportional, integral, derivative (PID) controller for controlling the poles of the system, and Tzafestas et al extended the concept of poles assignment by feedback controllers to the three-dimensional systems. The difficulty associated with the implementation of these methods is in knowing or determining the poles and the eigenvalues of the state-space model of the distributed-parameter system.

The prior art includes an optimal control technique as illustrated by Sage and White, in 1977, in a book entitled Optimum Systems Control (New Jersey: Prentice-Hall Inc.), and by Kou in 1980, in a book entitled Digital Control Systems (New York: Holt, Rinehart and Winston Inc.).

SUMMARY OF THE INVENTION

The present invention uses an optimal distributed-control technique based on an extension of the single-dimensional linear quadratic Gaussian technique as illustrated by Sage and White, and by Kou in 1980, in a book entitled Digital Control Systems (New York: Holt, Rinehart and Winston Inc.). The method requires a performance criterion be defined and the parameters of the system be known. The goal is to determine an optimal controller such that the performance criterion is minimized. The control gains may vary with respect to time and/or space. When this is the case, the optimal controller is referred to as a spatial-time varying optimal controller whereas for the case of constant gains the controller is said to be in steady-state. The steady-state gains of an N-dimensional discrete optimal controller are computed by a set of $N^{th}$-order polynomials. For example, the steady-state gains of a two-dimensional discrete optimal controller are computed from a set of fourth-order polynomials and it is called the optimal quartic controller. A number of theorems are presented to support the design procedure. The theorems are directly extended from the single-dimensional systems as illustrated by Kou to multidimensional systems.

My invention is particularly applicable to a control system that uses a model of a linear continuous distributed parameter system which, when excited by a stimulus, produces both desired and undesired output responses. Thus, it is desired to use the linear system in order to obtain its desired responses, but the undesired responses are objectionable and would be eliminated if possible. The undesired responses act on some physical body in an objectionable way. For example, consider the walls and motor of a refrigerator as a linear continuous distributed parameter system. The motor has the desired response of compressing refrigerant to operate the refrigerator, but, responsive to the motor, the walls have the undesired response of vibrating, which makes objectionable noise in the house in which the refrigerator is located. The transfer function of the linear system between the stimulus (for example, the power applied to the refrigerator motor) and the undesired response (for example, the vibrations which cause noise in the refrigerator walls) is converted to a state-space model of the transfer function and as such is used to govern the choices of possibilities to be made by a digital computer. The digital computer responds to the stimulus which excites the linear system to determine from the space-state model the possible responses for the linear system. Through choice-optimization logic, it derives an optimum canceling response and uses that derived optimum response to control a transducer which applies a derived physical response to the physical body to cancel the undesired output. For example, a time-coincident noise of equal amplitude and opposite polarity to the undesired noise being applied to the refrigerator walls can be applied to those walls to cancel the undesired output response.

The conversion to a distributed state-space model can be done by describing the continuous distributed transfer function of the linear distributed system using a quasi-Laplace or Moshfegh transform format, then applying a quasi-Z or Chester transform to the quasi-Laplace or Moshfegh transform format to derive a digital transfer distributed transfer function, and then converting the digital transfer function into a distributed state-space model. These are called quasi-Laplace (or Moshfegh) and quasi-Z (or Chester) formats because, unlike the strictly traditional Laplace and Z transforms which operate on differential equations involving only one independent variable, typically a time functions, the quasi functions may operate on partial differential equations involving a plurality of independent variable, typically both time and spatial dimensions. Otherwise, the mathematics is similar to that involved with the strictly traditional forms of the formats. A quasi-Laplace transform, also called a Moshfegh transform, is defined as a transform which is mathematically in the nature of a Laplace transform except that, whereas a Laplace transform involves time dimensions as the only independent variable involved in the transform, a quasi-Laplace transform or Moshfegh transform uses space dimensions as an independent variable in at least one (but not all) of the places where a Laplace transform would use time dimensions. A quasi-Z transform, also called a Chester transform, is defined as a transform which is mathematically in the nature of a Z-transform except that, whereas a Z-transform involves time dimensions as the only independent variable involved in the transform, a quasi-Z transform or Chester transform uses space dimensions as an independent variable in at least one (but not all) of the places where a Z-transform would use time dimensions.

DESCRIPTION OF THE PREFERRED EMBODIMENT

Figure 1:
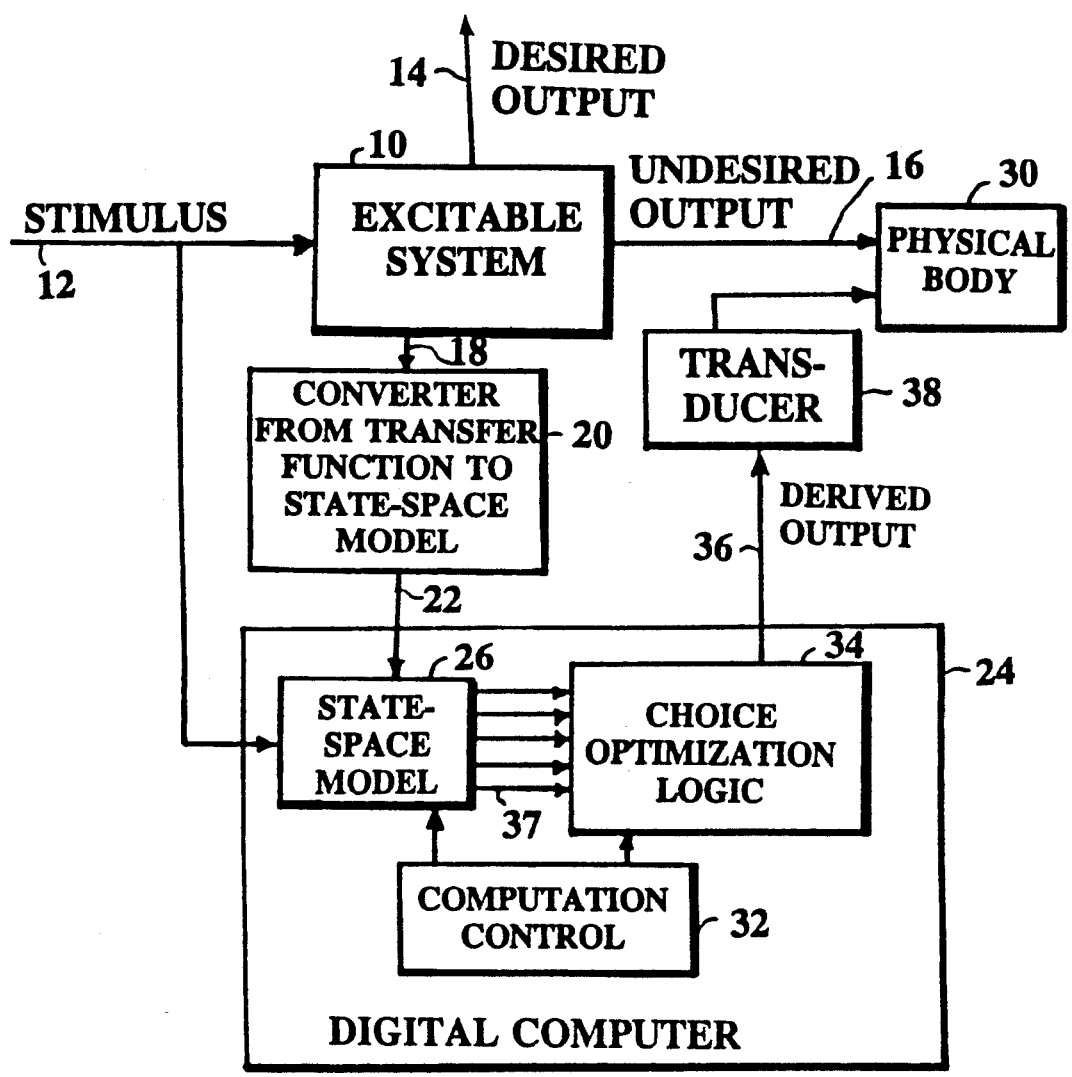
FIGS. 1 and 1A provide an overall block diagram of a preferred embodiment of the invention.

FIG. 1 provides an overall schematic view of the preferred embodiment of the invention. An excitable system 10, which is a linear continuous distributed parameter system, is excited by a stimulus 12 to produce a desired output 14 and an undesired output 16. The continuous transfer function 18 of the excitable system is derived by prior art methods and techniques discussed herein are used by a converter 20 to convert this continuous transfer function into a representation 22 of a space-state model 26 of the transfer function for use in a digital computer as the space-state model upon which it operates as a digital controller. The undesired output 16 adversely affects a physical body 30. Digital computer 24, under the control of computation control logic 32, operates a choice optimization logic section 34 to choose an optimum derived output 36 from those family of outputs 37 available from state-space model 26. The optimum derived output is applied to a transducer 38, which applies a cancellation output response to the physical body 30, thereby canceling the effects of the undesired output 16.

Figure 1A:
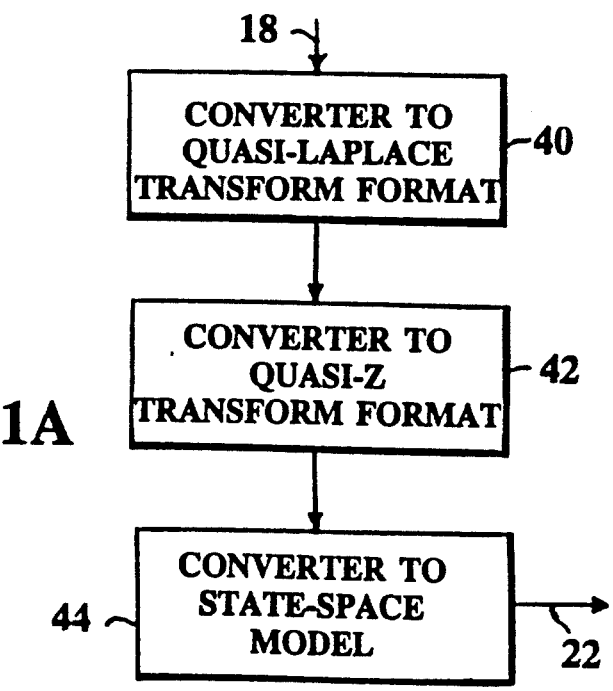

FIG. 1A shows a further breakdown of converter 20, showing that it operates, preferably off-line at an earlier time than the rest of the control function illustrated in FIG. 1, by converting a distributed parameter model of system 10 into a quasi-Laplace transform format in a first converter 40, converting the quasi-Laplace transform version to a quasi-Z transform format in a second converter 42, and finally converting the quasi-Z transform format in a third converter 44 into the solid-space model. In practice, these various converters are sequential uses of a digital computer under the control of the equations appropriate for the particular conversion.

Most physical processes typically fall into one of the following classes of partial differential equations: hyperbolic, parabolic, or elliptic. The hyperbolic class of differential equations originates from vibratory systems, structural or fluid-borne acoustic noises and shock waves. Heat conduction and unsteady-state heat flow processes are described by the parabolic class of differential equations. The steady-state potential distribution or temperature equilibrium problems are generally associated with the elliptic class.

The distributed-parameter system considered in this section is described by a generalized second-order partial differential equation with respect to two independent variables x (spatial variable), and t (time variable) and is presented by:

$$a\frac{\partial^2 y(x,t)}{\partial x^2} + b\frac{\partial^2 y(x,t)}{\partial x \partial t} + c\frac{\partial^2 y(x,t)}{\partial t^2} + d\frac{\partial y(x,t)}{\partial x} + e\frac{\partial y(x,t)}{\partial t} + fy(x,t) = gu(x,t) \quad (1)$$

where a, b, c, d, e, f, and g may also be functions of the independent variables x and t. Depending on the values of the coefficients of the second partial derivative terms,-system (1) is classed as hyperbolic when $(b^2-4ac)>0$, parabolic when $(b^2-4ac)=0$, and elliptic when $(b^2-4ac)<0$. Distributed-parameter system (1) is transformed into a state-space model based on a technique discussed in my doctoral dissertation, cited above. The summary of the procedure is as follows:

a. Apply the multidimensional Laplace-like transformation to the dynamic equation (1).
b. Eliminate any term that contains a zero as an argument.
c. Derive the continuous multidimensional transfer function.
d. Convert the continuous transfer function to a discrete one using the multidimensional bilinear transformation.
e. Realize a multidimensional state-space model from the discrete transfer function.

This gives the following two-dimensional discrete state-space model:

$$\begin{bmatrix} x^h(i+1,j) \\ x^v(i,j+1) \end{bmatrix} = \begin{bmatrix} A_1 & A_2 \\ A_3 & A_4 \end{bmatrix} \begin{bmatrix} x^h(i,j) \\ x^v(i,j) \end{bmatrix} + \begin{bmatrix} B_1 \\ B_2 \end{bmatrix} u(i,j) \quad (2a)$$

$$y(i,j) = [C_1 \ C_2] \begin{bmatrix} x^h(i,j) \\ x^v(i,j) \end{bmatrix} + Du(i,j) \quad (3a)$$

The compact form is given by:

$$X^{11}(i,j) = \Phi X(i,j) + \Psi u(i,j) \quad (2b)$$

$$y(i,j) = \Lambda X(i,j) + D u(i,j) \quad (3b)$$

where $x^h(i,j) \in R^n$ and $x^v \in R^m$ are the state vectors, $u(i,j) \in R^p$ is the input or the external force vector acting on the system, and $y(i,j) \in R^q$ is the system response. Matrices $A_1, A_2, A_3, A_4, B_1, B_2, C_1, C_2,$ and D are of appropriate dimensions, real and constant. The continuous initial and boundary conditions of the dynamic system (1) must also be converted to a set of conditions in terms of the state variables of the multidimensional discrete model (2a). Thus the initial and boundary conditions are presented by the following two equations:

$$\begin{bmatrix} x^h(i,0) \\ x^v(i,0) \end{bmatrix} \text{ for } i = 0, 1, 2, \ldots \quad (4)$$

$$\begin{bmatrix} x^h(0,j) \\ x^v(0,j) \end{bmatrix} \text{ for } j = 0, 1, 2, \ldots \quad (5)$$

respectively. To control the dynamics of two-dimensional system (2a)-(3a) in an optimal manner it is necessary to determine an optimal control law such that it minimizes a desired performance criterion and to influence the dynamics of the state variables $x^h(i,j)$ and $x^v(i,j)$ in some desired fashion. However, the system must satisfy certain requirements. For instance, the system must be at least locally controllable which means that all the states can be influenced by the control law, and the control law itself must be at least locally observable.

The objective is to define a meaningful performance criterion by which a distributed-parameter system is controlled. To determine such a performance criterion, a loss function must be defined. A loss function describes losses incurred when the actual states or the outputs of the system are not equal to the prescribed states or the prescribed outputs. A loss function may be formulated in terms of the state variables $x^h(i,j)$ and $x^v(i,j)$, the control function $u(i,j)$ and system's response $y(i,j)$. Note, $x^h(i,j)$ is denoted by $x^h(i,j=1,2,\ldots;x^h(0,j); x^v(i,0); u(i,j))$, similarly $x^v(i,j)$ is denoted by $x^v(i,j=1,2,\ldots;x^h(0,j); x^v(i,0); u(i,j))$. The following are some possible loss functions:

$$L_1(i,j) = \|X(i,j)\|_{Q(i,j)}^2 + \|u(i,j)\|^2_R + X(i,j)'Su(i,j) + [Su(i,j)]'X(i,j)$$

$$L_2(i,j) = \|y(i,j)\|^2_Z + \|u(i,j)\|^2_R + y(i,j)'Su(i,j) + [Su(i,j)]'y(i,j)$$

$$L_3(i,j) = \|u(i,j)\|^2_R$$

Matrix $Q(i,j)$ is of dimension $[(n+m), (n+m)]$, nonnegative definite, symmetric and real; matrix R is of dimension $[p,p]$, positive definite, symmetric, real and constant; matrix S is of dimension $[(n+m),p]$, real and constant; matrix Z is of dimension $[q,q]$, nonnegative definite, symmetric, real and constant. Also $Q(i,j)$-SS' and Z-SS' are nonnegative definite. A performance criterion based on loss function $L_1(i,j)$ is presented by:

$$J_1 = 0.5 \sum_{i=0}^{N} \sum_{j=0}^{M} L_1(i,j) \quad (6)$$

where $0 \leq N \leq \infty$ and $0 \leq M \leq \infty$. The next step is to determine the optimal control law.

Procedures and theorems of optimization for optimum performance of a single-dimensional system are well defined, Sage (1977). One optimization technique is by Pontr'yagin's maximum principle. This technique sets up a differential equation known as the Hamilton-Jacobi equation. From the Hamilton-Jacobi equation an optimal control law can be derived that minimizes the performance criterion. This concept can be extended for the optimization of a multidimensional performance criterion, as will be seen below. The extension of Pontryagin's maximum principle is considered for the two-dimensional performance criterion (6) but the procedure can easily be extended to higher dimensional performance criteria.

CASE 1.

Time-Spatial Varying Optimal Control Gain

Problem Statement: Find an optimum control law $u^o(i,j)$ such that the performance criterion:

$$J_1 = 0.5 \, \|X(N, M)\|^2_{R(N,M)} + 0.5 \sum_{i=0}^{N-1} \sum_{j=0}^{M-1} L_1(i,j) \tag{7}$$

is minimized, where $J_1$ is subjected to the two-dimensional system constraint (2a). The following is the outline of the two-dimensional optimization procedure:

Step 1: Define a two-dimensional function $H(i,j)$. $H(i,j)$ defines the augmentation of system constraint (2a) and the loss function $L_1$ by two costate vectors $\lambda(i,j) \epsilon R^n$ and $\gamma(i,j) \epsilon R^m$. Costates $\lambda(i,j)$ and $\gamma(i,j)$ correspond to the state variables $x^h(i,j)$ and $x^v(i,j)$, respectively. Function $H(i,j)$ is named the two-dimensional Hamiltonian function and is denoted by:

$$H(i,j) = 0.5 L_1(i,j) + \begin{bmatrix} \lambda(i+1,j) \\ \gamma(i,j+1) \end{bmatrix}' (\Phi X(i,j) + \Psi u(i,j)) \tag{8}$$

where, $$Q(i,j) = \begin{bmatrix} Q_1 & Q_2(i,j) \\ Q_2'(i,j) & Q_4 \end{bmatrix}; \quad S = \begin{bmatrix} S_1 \\ S_2 \end{bmatrix}$$

$Q_1$ is [n,n], $Q_4$ is [m,m], $S_1$ is [n,p], $S_2$ is [m,p], and R is [p,p]. Matrices $Q_1$ and $Q_4$ must be positive definite or semidefinite, symmetric, real, and constant; matrix R must be positive definite, symmetric, real, and constant; matrices $Q_1 - S_1 S_1'$ and $Q_4 - S_2 S_2'$ must be at least non-negative real and constant. Performance criterion $J_1$ is considered minimized if the two-dimensional Hamiltonian function, $H(i,j)$, has an absolute minimum with respect to the optimum control function, $u^0(i,j)$, for $i,j = 0, 1, 2, \ldots$ over the space of all admissible control functions $u(i,j)$. Let:

$$H(I,J) \Delta H(X(i,j); \lambda(i,j); \gamma(i,j); u(i,j); Q(i,j); R; S; i,j)$$

then, $$H(X^0; \gamma; i,j) \leq H(X^0; \lambda^0; \gamma^0; u; i,j)$$

Step 2: Establish the necessary conditions for the optimization. The first set of necessary conditions are with respect to the state variables:

$$\begin{bmatrix} \frac{\partial H(i,j)}{\partial x^h(i,j)} \\ \frac{\partial H(i,j)}{\partial x^v(i,j)} \end{bmatrix} = \begin{bmatrix} \lambda(i,j) \\ \gamma(i,j) \end{bmatrix} \tag{9}$$

or, $$\begin{bmatrix} \lambda(i,j) \\ \gamma(i,j) \end{bmatrix} = Q(i,j) X(i,j) + \Phi' \begin{bmatrix} \lambda(i+1,j) \\ \gamma(i,j+1) \end{bmatrix} + Su(i,j) \tag{10}$$

and the second set are with respect to the costates:

$$\begin{bmatrix} \frac{\partial H(i,j)}{\partial \lambda(i+1,j)} \\ \frac{\partial H(i,j)}{\partial \gamma(i,j+1)} \end{bmatrix} = \begin{bmatrix} x^h(i+1,j) \\ x^v(i,j+1) \end{bmatrix} \tag{11}$$

or, $$\begin{bmatrix} x^h(i+1,j) \\ x^v(i,j+1) \end{bmatrix} = \Phi X(i,j) + \Psi u(i,j) \tag{12}$$

The final necessary condition is with respect to $u(i,j)$:

$$\frac{\partial H(i,j)}{\partial u(i,j)} = 0 \tag{13a}$$

or, $$u(i,j) = S' X(i,j) + \Psi' \begin{bmatrix} \lambda(i+1,j) \\ \gamma(i,j+1) \end{bmatrix} \tag{13b}$$

Step 3: Assume a generalized solution for the costate vectors by defining a two-dimensional function $\Omega(i,j)$ that is a Lyapunov candidate function. This is presented by:

$$\Omega(i,j) = 0.5 \, \|X(i,j)\|^2_{P(i,j)} \tag{14}$$

where, $$P(i,j) = \begin{bmatrix} P^h(i,j) & 0 \\ 0 & P^v(i,j) \end{bmatrix}$$

Weighting matrices $P^h(i,j)$ and $P^v(i,j)$ are [n,n] and [m,m], respectively, and they are diagonal, symmetric and real. General solutions of the costate vectors are:

$$\begin{bmatrix} \frac{\partial \Omega(i,j)}{\partial x^h(i,j)} \\ \frac{\partial \Omega(i,j)}{\partial x^v(i,j)} \end{bmatrix} = \begin{bmatrix} \lambda(i,j) \\ \gamma(i,j) \end{bmatrix} \tag{15a}$$

or, $$\begin{bmatrix} \lambda(i,j) \\ \gamma(i,j) \end{bmatrix} = P(i,j) X(i,j) \tag{15b}$$

Step 4: Formulate the optimal control law $u^0(i,j)$ by using equations (9) to (15). This gives:

$$u^o(i,j) = -[G^h(i,j) \; G^v(i,j)] \begin{bmatrix} x^h(i,j) \\ x^v(i,j) \end{bmatrix} \tag{16a}$$

The compact form is presented by:

$$u^o(i,j) = -G(i,j) X(i,j) \tag{16b}$$

where, $$G(i,j) = \Gamma(i,j)(S' + \Psi' P^{11}(i,j)\Phi) \quad (17)$$

$$\Gamma(i,j) = (R + \Psi' P^{11}(i,j)\Psi)^{-1} \quad (18)$$

and, $$P^{11}(i,j) = \begin{bmatrix} P^h(i+1,j) & 0 \\ 0 & P^v(i,j+1) \end{bmatrix}$$

Figure 2:
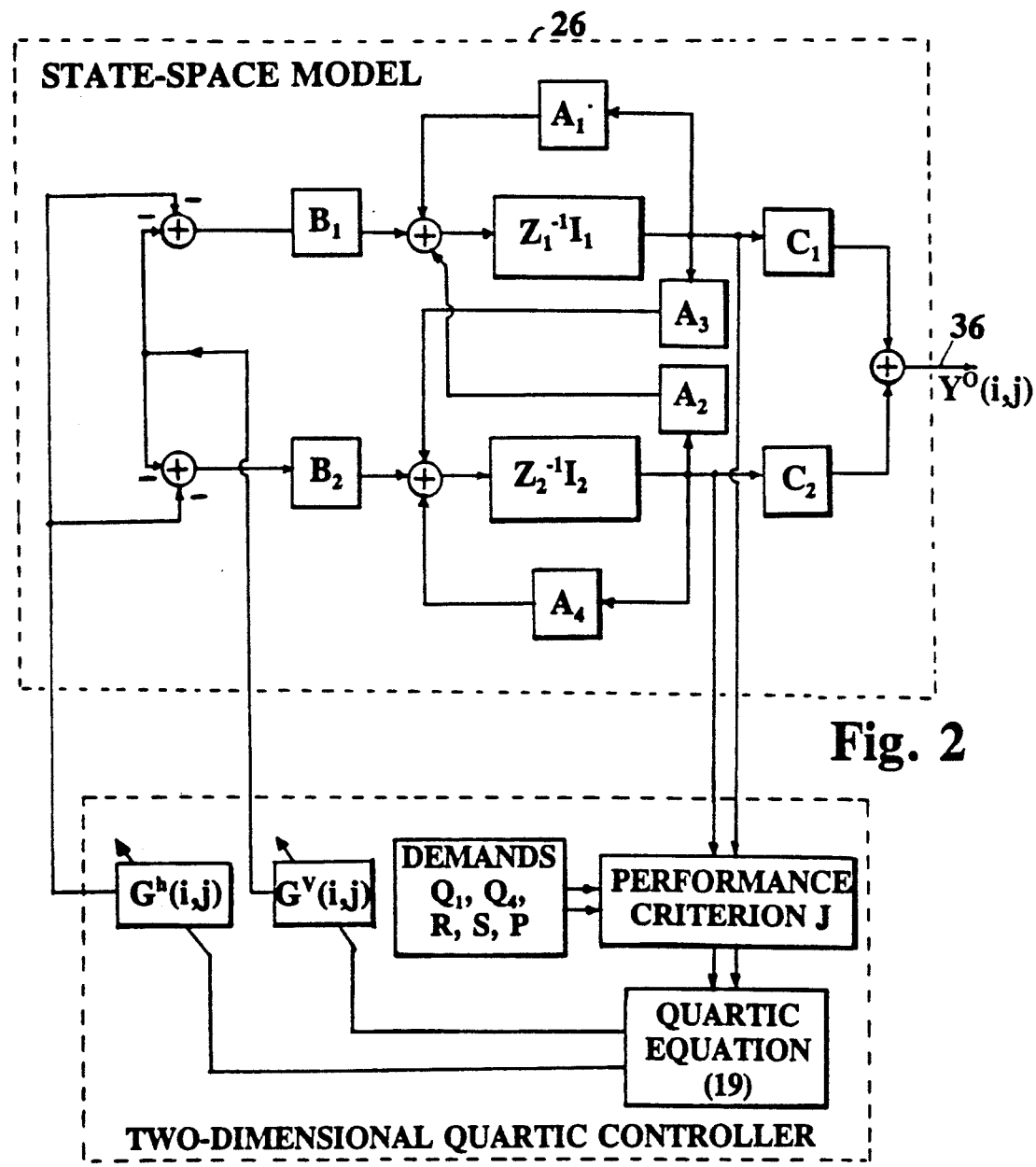
FIG. 2 is a block diagram of the structure of a two-dimensional discrete space-state model and an optimal distributed control system.

From the optimal gain $G(i,j)$, it can be observed that the requirement of the positive definiteness for matrix R can be removed since the inverse of R is no longer required. However, $\Gamma(i,j)$ must exist. The optimal control law $u^o(i,j)$ is a two-dimensional time-spatial varying controller and is referred to as Optimal Quartic Controller. FIG. 2 illustrates the two-dimensional discrete state-space model along with the optimal quartic controller.

Step 5: Compute weighting matrices $P^h(i,j)$ and $P^v(i,j)$. Substitute equations (12), (15b) and (16b) into equation (10) then eliminate $X(i,j)$ from both sides of the equation. This gives:

$$P(i,j) = \Phi' P^{11}(i,j)(\Phi - \Psi G(i,j)) - S\,G(i,j) + Q(i,j) \quad (19)$$

Equation (19) is named Linear Quartic Regulator (LQR). LQR is computed recursively by backward iteration in terms of $P^h(i\Delta,j\Delta)$, $P^v(i\Delta,j\Delta)$ and $Q_2(i\Delta,j\Delta)$ starting from the known weighting matrix $P(N,M)$. $P(N,M)$ is defined in the performance criterion $J_1$ (7):

$$P(N,M) = \begin{bmatrix} P^h(N,M) & 0 \\ 0 & P^v(N,M) \end{bmatrix}, \quad (20)$$

for $0 < N < \infty; 0 < M < \infty$

Figure 3:
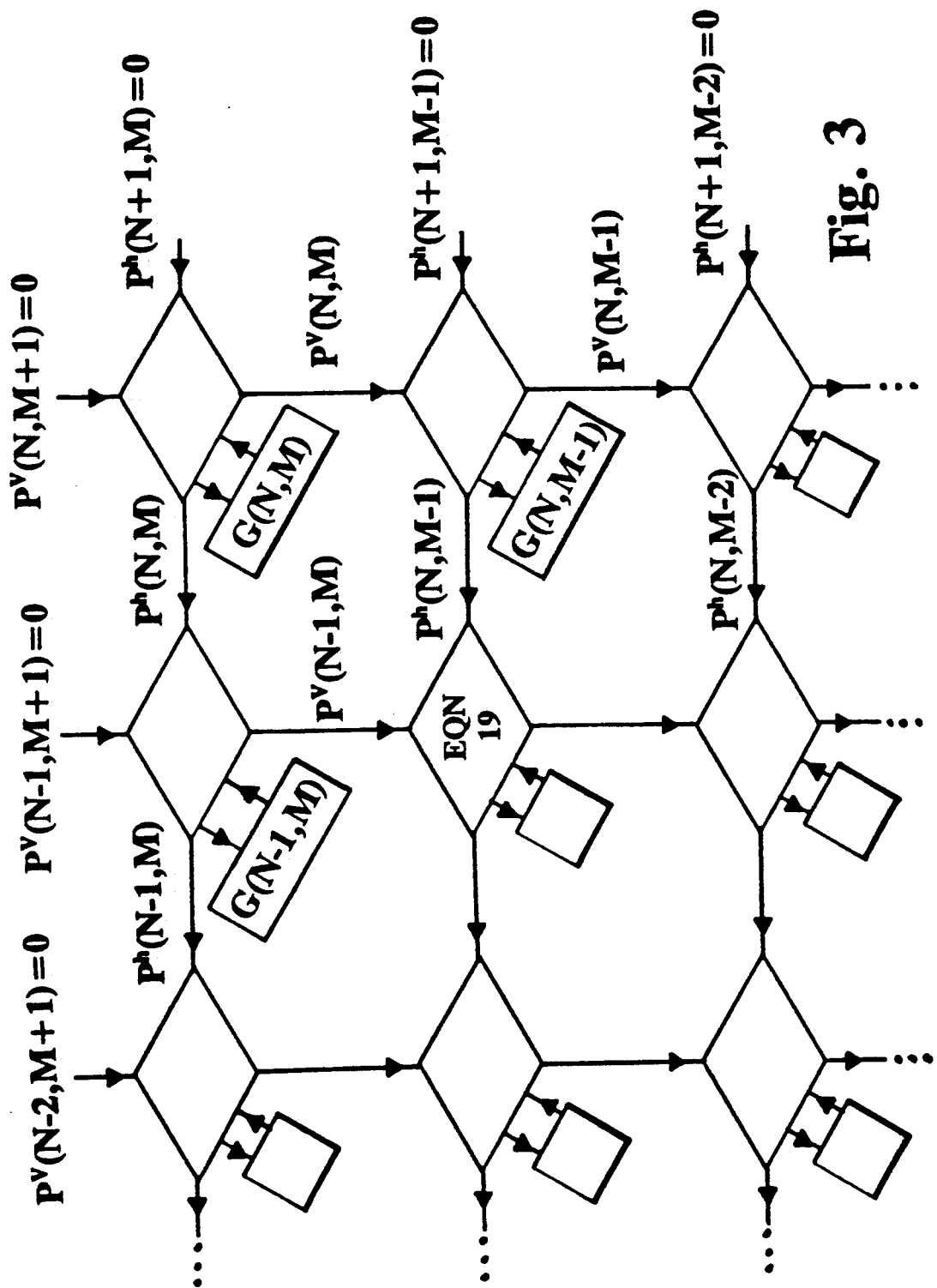
FIG. 3 is a diagram showing two-dimensional propagation of the weighting factors $P^h(i,j)$ and $P^v(i,j)$.

Matrices $P^h(N,M)$ and $P^v(N,M)$ are positive definite, symmetric, real and constant. FIG. 3, presents the two-dimensional backward propagation of the weighting matrices $P^h(i,j)$ and $P^v(i,j)$ starting from the time-spatial point $(N,M)$. LQR has $(n+m)^2$ equations and the total number of unknown parameters in matrices $P^h$, $P^v$ and $Q_2$ are given by the following relationship:

$$\alpha = nm + \sum_{i=0}^{n}(n-i) + \sum_{i=0}^{m}(m-i) \quad (21)$$

Case 2. Steady-State or Time-Spatial Invariant Optimal Control Gain:

In this case the performance criterion contains infinite summations with respect to independent variables. For example, considering performance criterion (7) for $N = \infty$ and $M = \infty$. This gives:

$$J = 0.5 \sum_{i=0}^{\infty}\sum_{j=0}^{\infty} L_1(i,j) \quad (22)$$

Weighting matrices $P^h(N,M)$ and $P^v(N,M)$ are selected to be null matrices when $(N,M) = (\infty, 28)$. The reason is that their values have no impact on the final result of matrix P. The optimization procedure is similar to the previous case and the system (the state-space model) must be locally controllable and observable. As $(i,j) \to (\infty, \infty)$ the optimal control gain $G(i,j)$, the weighting matrices $P(i,j)$ and $Q_2(i,j)$ become constant:

$$\lim_{(i,j)\to(\infty,\infty)} [G(i,j); P(i,j); Q_2(i,j); i,j] = [G_{ss}; P_{ss}; Q_{2ss}] \quad (23)$$

Therefore, the steady-state optimal quartic control law is presented by:

$$u^o(i,j) = -[G_{ss}^h \ G_{ss}^v]\begin{bmatrix} x^h(i,j) \\ x^v(i,j) \end{bmatrix} \quad (24)$$

where, $$G_{ss} \triangleq [G_{ss}^h \ G_{ss}^v] = (R + \Psi' P_{ss}\Psi)^{-1}(S' + \Psi' P_{ss}\Phi) \quad (25)$$

Weighting matrix $P_{ss}$ is determined by solving the following simultaneous quartic matrix equation:

$$P_{ss} = \Phi' P_{ss}(\Phi - \Psi G_{ss}) - S\,G_{ss} + Q_{ss} \quad (26)$$

where, $$P_{ss} \triangleq \begin{bmatrix} P_{ss}^h & 0 \\ 0 & P_{ss}^v \end{bmatrix}; \ Q_{ss} \triangleq \begin{bmatrix} Q_1 & Q_{2ss} \\ Q'_{2ss} & Q_4 \end{bmatrix}$$

Theorem 1: Weighting matrices $P^h(i,j)$ and $P^v(i,j)$ are symmetric.

Proof: Let matrices R and $Q(i,j)$ be symmetric. Matrix transpose of LQR (19) is:

$$P'(i,j) = (\Phi' - G'(i,j)\Psi')P^{11'}(i,j)\Phi - G'(i,j)S' + Q'(i,j)$$

The only difference between equation above and equation (19) matrices $P(i,j)$ and $P^{11}(i,j)$ are replaced by $P'(i,j)$ and $P^{11'}(i,j)$ respectively. The two equations produce the same results. This implies $P(i,j) = P'(i,j)$ and $P^{11}(i,j) = P^{11'}(i,j)$. In other words, matrices $P(i,j)$ and $P^{11}(i,j)$ are symmetric.

Theorem 2: Given a performance criterion described by:

$$J_{[N-i,M-j]}(X(i,j); u(i,j)) = 0.5\|X(N,M)\|^2_{P(N,M)} + 0.5 \sum_{i=0}^{N-1}\sum_{j=0}^{M-1} L_1(k,l) \quad (27)$$

and subjected to the distributed-parameter system (2a). The optimum performance criterion for the case when $0 \leq M < \infty$ and $0 \leq N < \infty$ is:

$$J^o_{[N-k,M-l]} = 0.5\left(\begin{bmatrix} x^h(N-k,M-l) \\ x^v(N-k,M-l) \end{bmatrix}' \begin{bmatrix} P^h(N-k,M-l) & 0 \\ 0 & P^v(N-k,M-l) \end{bmatrix} \begin{bmatrix} x^h(N-k,M-l) \\ x^v(N-k,M-l) \end{bmatrix} + \quad (28)$$

-continued $$\begin{bmatrix} x^h(N-k, M-l+1) \\ x^v(N-k+1, M-l) \end{bmatrix}' \begin{bmatrix} P^h(N-k, M-l+1) & 0 \\ 0 & P^v(N-k+1, M-l) \end{bmatrix} \begin{bmatrix} x^h(N-k, M-l+1) \\ x^v(N-k+1, M-l) \end{bmatrix} \Bigg)$$

and for the case when $M = \infty$ and $N = \infty$ is:

$$J^o_{[\infty, \infty]} = \begin{bmatrix} x^h(0,0) \\ x^v(0,0) \end{bmatrix}' \begin{bmatrix} P^h_{ss} & 0 \\ 0 & P^v_{ss} \end{bmatrix} \begin{bmatrix} x^h(0,0) \\ x^v(0,0) \end{bmatrix} \quad (29)$$

where, $$\begin{bmatrix} P^h_{ss} & 0 \\ 0 & P^v_{ss} \end{bmatrix} = \lim_{(k,l) \to (\infty, \infty)} P(N-k, M-l) \quad (30)$$

Theorem 3: Performance criterion J is described by:

$$J = 0.5 \sum_{i=0}^{\infty} \sum_{j=0}^{\infty} (\|X(i,j)\|^2_{Q_{ss}} + \|u(i,j)\|^2_{R}) \quad (31)$$

If matrices $Q_{ss}$ and R are positive definite, real and symmetric, then weighting matrix $P_{ss}$ is positive definite.

Proof: Since matrices $Q_{ss}$ and R are positive definite, then performance criterion (31) is positive. The reason is that the performance criterion J is a quadratic function of the state variables and the control law. From theorem 2, J is presented by the quadratic relation (29). Using equation (29) and knowing that J is positive then $P_{ss}$ must be positive definite.

The optimal state and output responses of the system are presented by:

$$\begin{bmatrix} x^h(i+1,j) \\ x^v(i,j+1) \end{bmatrix} = \begin{bmatrix} A_1 - B_1 G^h(i,j) & A_2 - B_1 G^v(i,j) \\ A_3 - B_2 G^h(i,j) & A_4 - B_2 G^v(i,j) \end{bmatrix} \begin{bmatrix} x^h(i,j) \\ x^v(i,j) \end{bmatrix} \quad (32)$$

$$y(i,j) = [C_1 - D\,G^h(i,j) \quad C_2 - D\,G^v(i,j)] \begin{bmatrix} x^h(i,j) \\ x^v(i,j) \end{bmatrix} \quad (33)$$

respectively.

Theorem 4: Consider performance criterion (31) under constraint of the controllable distributed-parameter system (2a)–(3a) where weighting matrices $Q_{ss}$ and R are positive definite, real and symmetrical. The initial state variables $x^h(0,0)$ and $x^v(0,0)$ are observable and the optimal quartic controller that minimizes the performance criterion is:

$$u^o(i,j) = -[G^h_{ss} \quad G^v_{ss}] \begin{bmatrix} x^h(i,j) \\ x^v(i,j) \end{bmatrix}$$

where, $$[G^h_{ss}\ G^v_{ss}] = (R + \Psi' P_{ss} \Psi)^{-1} \Psi' P_{ss} \Phi \quad (34)$$

and $$P_{ss} = \Phi' P_{ss} (\Phi - \Psi G_{ss}) + Q_{ss} \quad (35)$$

Then the closed-loop optimal feedback system:

$$\begin{bmatrix} x^h(i+1,j) \\ x^v(i,j+1) \end{bmatrix} = \begin{bmatrix} A_1 - B_1 G^h_{ss} & A_2 - B_1 G^v_{ss} \\ A_3 - B_2 G^h_{ss} & A_4 - B_2 G^v_{ss} \end{bmatrix} \begin{bmatrix} x^h(i,j) \\ x^v(i,j) \end{bmatrix} \quad (36)$$

is asymptotically stable.

Proof: By theorem 3, weighting matrix $P_{ss}$ is positive definite if weighting matrices $Q_{ss}$ and R are positive definite. Define a two-dimensional discrete Lyapunov candidate function:

$$V[X(i,j)] \triangleq V[x^h(i,j);\, x^v(i,j);\, i,j] = 0.5\, \|X(i,j)\|^2_{P_{ss}} \quad (37)$$

The Lyapunov candidate function V has the following properties:
a) V[X(i,j)] is a positive valued function for all $x^h(i,j) \neq 0$ and $x^v(i,j) \neq 0$
b) V[X(i,j)] is zero for $x^h(i,j) = 0$ and $x^v(i,j) = 0$
c) V[X(i,j)] approaches infinity as $\|X(i,j)\| \to \infty$ Let, $$V[X^{11}(i,j)] = V^h[x^h(i+1,j);\, x^v(i,j)] + V^v[x^h(i,j);\, x^v(i,j+1)]$$

then, $$\Delta V[X(i,j)] = V[X^{11}(i,j)] - V[X(i,j)] \quad (38)$$

or, $$\Delta V[X(i,j)] = 0.5\,(\|X^{11}(i,j)\|^2_{P_{ss}} - \|X(i,j)\|^2_{P_{ss}}) \quad (39)$$

If $\Delta V[X(i,j)] < 0$ then the closed-loop system (36) is asymptotically stable. Substitute equation (36) into equation (39). This gives:

$$\Delta V[X(i,j)] = 0.5 X'(i,j)((\Phi - \Psi G_{ss})' P_{ss} (\Phi - \Psi G_{ss}) - P_{ss}) \cdot X(i,j) \quad (40)$$

Substitute the right hand side of equation (35) into equation (40). This gives the following reduced form relation:

$$\Delta V[X(i,j)] = -0.5\, X'(i,j)\,(Q+Y) X(i,j) \quad (41)$$

where, $$Y = G'_{ss} \Psi' P_{ss} (\Phi - \Psi G_{ss}) \quad (42)$$

From equation (34) the following identity holds:

$$\Psi' P_{ss} \Phi = (R + \Psi' P_{ss} \Phi) G_{ss} \quad (43)$$

Then Y is reduced to the following relationship by substituting equation (43) into equation (42):

$$Y = G'_{ss} R\, G_{ss} = \|G_{ss}\|^2_R \quad (44)$$

Matrices $Q_{ss}$ and $P_{ss}$ are positive definite and matrix Y is nonnegative definite because R is positive definite. Therefore, $\Delta V[(X(i,j)]$ is nonpositive, V[X(i,j)] is a two-dimensional Lyapunov function and the closed-loop system (36) is asymptotically stable.

The performance of the optimal distributed-control system can be demonstrated by considering the dynamics of noise (acoustic noise) in a combustion chamber. The linearized equation of motion for such a process is described by the following second-order continuous hyperbolic differential equation:

$$a_1 \frac{\partial^2 y(x,t)}{\partial x \partial t} + a_2 \frac{\partial y(x,t)}{\partial t} + a_3 \frac{\partial y(x,t)}{\partial x} + a_4 y(x,t) = bu(x,t) \quad (45)$$

for $t>0$ and $0<x<L$, where is L the length of the chamber. The boundary and initial conditions are given by:

$$y(0,t) = W(t); \; 0 \leq t \quad (46)$$

and $$y(x,0) = F(x); \; 0 \leq x \leq L \quad (47)$$

respectively. The state-space model of the distributed-parameter system (45) is obtained by implementing the steps outlined in section 2.1. The steps are:

Step 1, multidimensional Laplace-like transformation:
$$L_x L_t[\text{Model}(45)] = a_1(s_1 s_2 Y(s_1,s_2) - s_2 Y(0,s_2)$$
$$- s_1 Y(s_1,0) + Y(0,0)) + a_2(s_2 Y(s_1,s_2) - Y(s_1,0)) + a_3(-s_1 Y(s_1,s_2)$$
$$- Y(0,s_2)) + a_4 Y(s_2,s_2) = bU(s_1,s_2) \quad (48)$$

Step 2, eliminate terms with zero as the argument in equation (48):

$$[a_1 s_1 s_2 + a_2 s_2 + a_3 s_1 + a_4] Y(s_1,s_2) = bU(s_1,s_2) \quad (49)$$

Step 3, derive the continuous multidimensional transfer function:

$$H(s_1,s_2) = \frac{Y(s_1,s_2)}{U(s_1,s_2)} = \frac{\frac{b}{a_1}}{s_1 s_2 + \frac{a_2}{a_1} s_2 + \frac{a_3}{a_1} s_1 + \frac{a_4}{a_1}} \quad (50)$$

Step 4, convert transfer function (50) to a discrete transfer function using bilinear transformation:

$$H(z_1,z_2) = H(s_1,s_2) \text{ for} \quad (51)$$

$$s_1 = \frac{2}{\Delta x} \frac{z_1 - 1}{z_1 + 1}; \; s_2 = \frac{2}{\Delta t} \frac{z_2 - 1}{z_2 + 1}$$

where, $\Delta x$ and $\Delta t$ are sampling intervals with respect to space and time.

Figure 4:
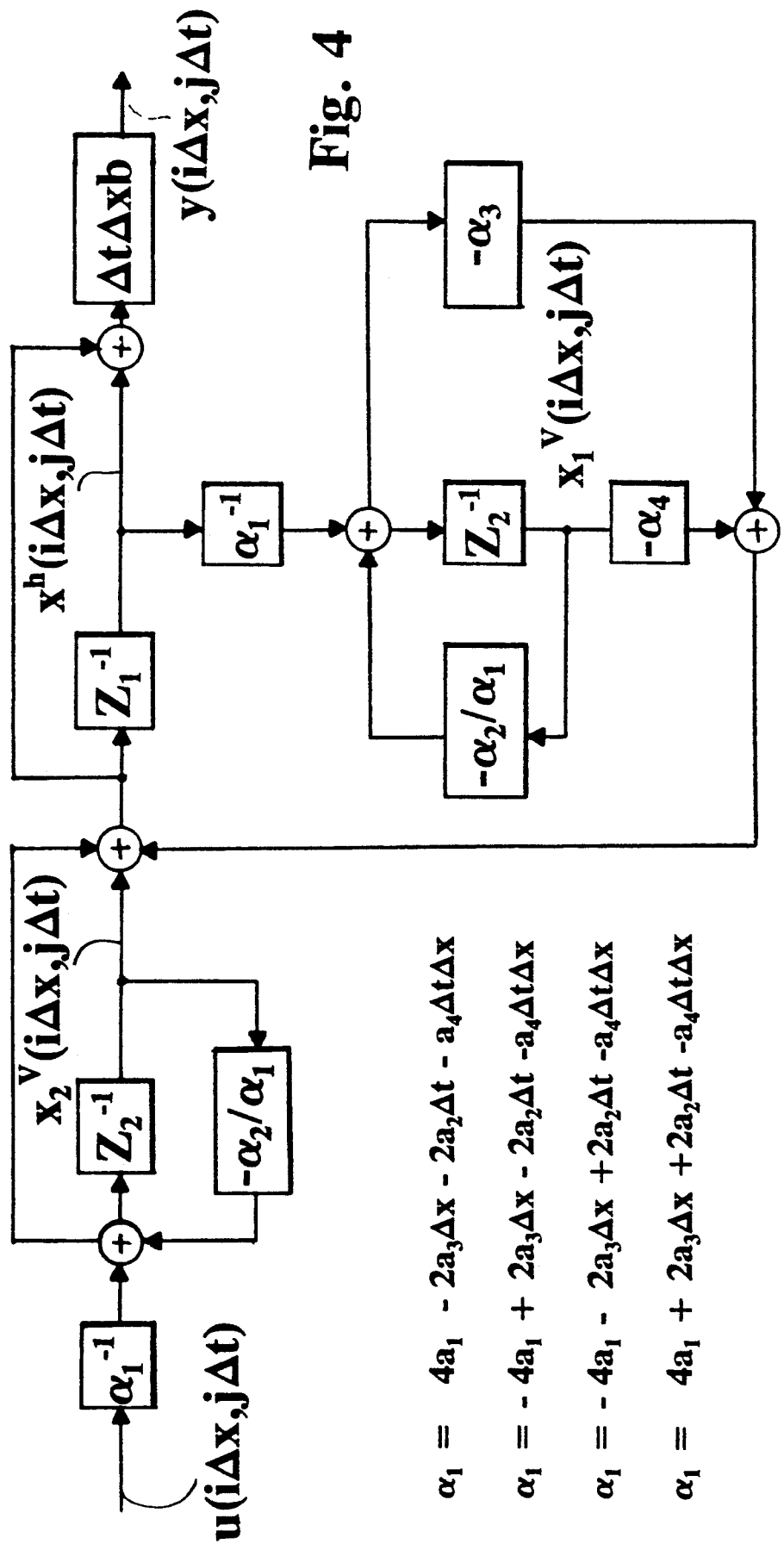
FIG. 4 is a signal-flow diagram of a distributed parameter system.

Step 5, realize the discrete transfer function (51) into a state-space model, see FIG. 4. The state-space model is presented by:

$$X^{11}(i\Delta x, j\Delta t) = \Phi X(i\Delta x, j\Delta t) + \Psi u(i\Delta x, j\Delta t) \quad (52)$$

$$y(i\Delta x, j\Delta t) = \Delta X(i\Delta x, j\Delta t) + D \, u(i\Delta x, j\Delta t) \quad (53)$$

where,
where, $$X^{11}(i\Delta x, j\Delta t) \doteq \begin{bmatrix} x^h((i+1)\Delta x, j\Delta t) \\ x^v(i\Delta x, (j+1)\Delta t) \end{bmatrix}; \; X(i\Delta x, j\Delta t) \doteq \begin{bmatrix} x^h(i\Delta x, j\Delta t) \\ x^v(i\Delta x, j\Delta t) \end{bmatrix}$$

$$\Phi \doteq r^{-1} \begin{bmatrix} 4a_1 - 2a_3\Delta x + 2a_2\Delta t - a_4\Delta x \Delta t & 8a_1 + 4a_3\Delta x \\ \frac{4\Delta x \Delta t(-a_1 a_4 + a_2 a_3)}{2a_1 + a_3\Delta x} & 4a_1 + 2a_3\Delta x - 2a_2\Delta t - a_4\Delta x \Delta t \end{bmatrix}$$

$$\Psi \doteq \frac{a_1}{r} \begin{bmatrix} 1 \\ 1 \end{bmatrix}; \; \Lambda \doteq \frac{2\Delta x \Delta t \, b}{r a_1} [2a_1 + a_2\Delta t \; 2a_1 + a_3\Delta x]; \; D \doteq \frac{\Delta x \Delta t \, b}{r}$$

and, $$r = a_1^{-1}(4a_1 + 2a_3\Delta x + 2a_2\Delta t + a_4\Delta x \Delta t)$$

Figure 5:
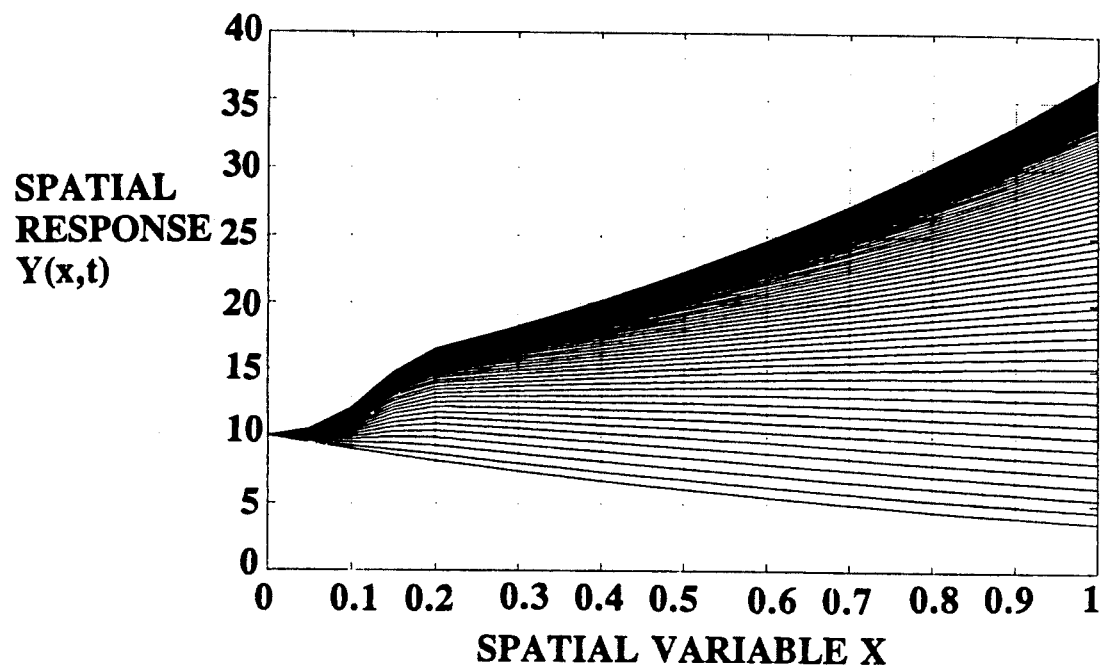
FIG. 5 is a graph showing uncontrolled spatial responses of a distributed parameter system for various time samples.
Figure 6:
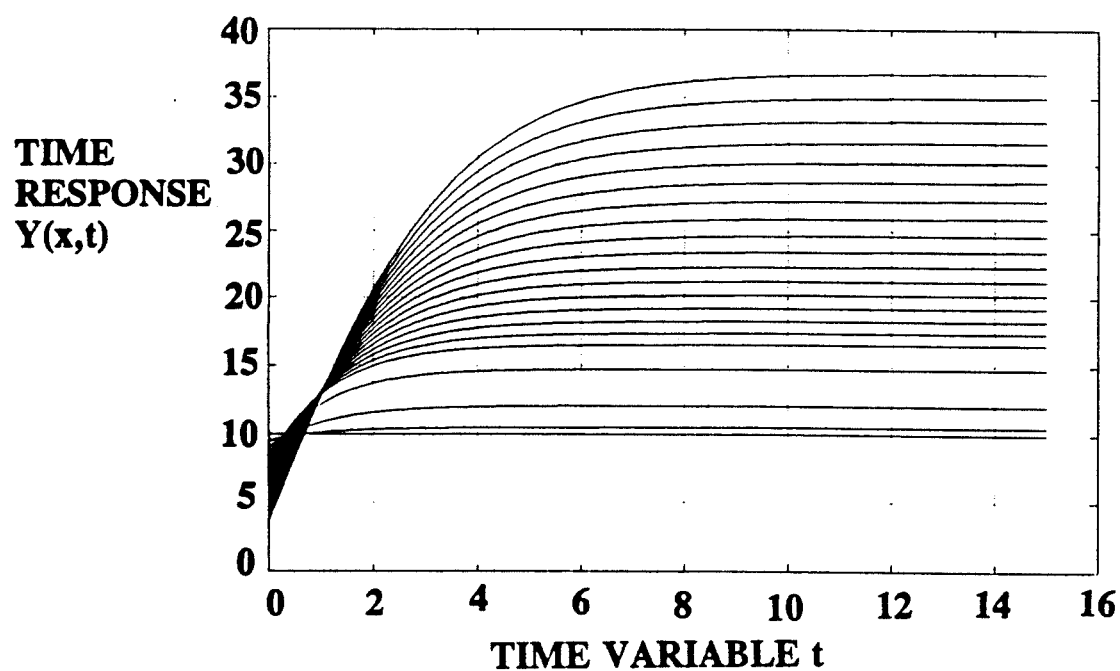
FIG. 6 is a graph showing uncontrolled time responses of a distributed parameter system for various spatial samples.
Figure 7:
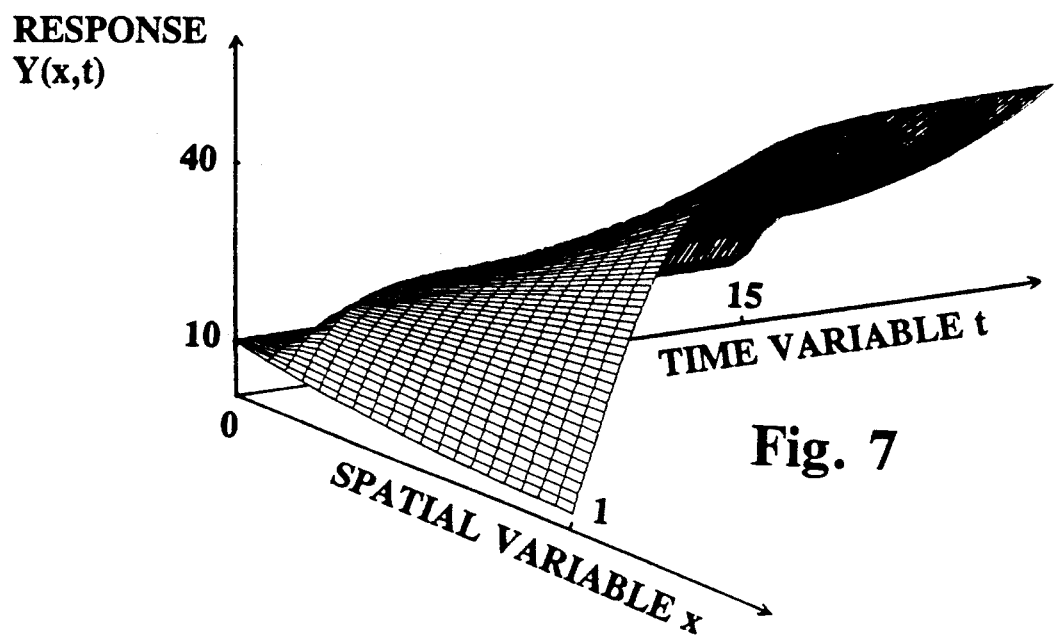
FIG. 7 is a graph of overall uncontrolled spatial-time response of a distributed-parameter system.

Consider the case when coefficients of the distributed-parameter system are $a_1 = a_2 = a_3 = 1$, $a_4 = -1$, and $b = 1$. The initial condition is defined as $W(t) = 10 \, e^{-t}$, the boundary condition is constant and is given by $F(x) = 10$ and the length of the chamber is normalized to unity. The discrete approximation of the initial and boundary conditions are:

$$y(\Delta x, 0) = 10 e^{-i\Delta x} \text{ for } L = M\Delta x = 1; \; i = 0, 1, 2, \ldots, M \quad (54)$$

and, $$y(0, j\Delta t) = 10 \text{ for } j = 0, 1, 2, \ldots \quad (55)$$

respectively. The sampling intervals with respect to time and space are $\Delta t = 0.1$ and $\Delta x = 0.05$, respectively. The spatial and time responses of the system are shown in FIGS. 5 and 6, respectively. The three-dimensional distributed motion is shown in FIG. 7. In order to control the noise in the chamber the following performance criterion:

$$J = 0.5 \| X(20\Delta x, 50\Delta t) \|^2_{P(20,50)} + \sum_{i=0}^{19} \sum_{j=0}^{49} (\| X(i\Delta x, j\Delta t) \|_{Q(i,j)} + \| u(i\Delta x, j\Delta t) \|_{R^2}) \quad (56)$$

is minimized. The weighting matrices are:

$$Q(i\Delta x, j\Delta t) = \begin{bmatrix} Q_1 & Q_2(i\Delta x, j\Delta t) \\ Q_2'(i\Delta x, j\Delta x) & Q_4 \end{bmatrix};$$

for $Q_1 = 100$; $Q_4 = 450$ where $Q_2(i\Delta, j\Delta)$ to be determined by a LQR relationship, and $$P(20\Delta x, 50\Delta t) = \begin{bmatrix} 1 & 0 \\ 0 & 1 \end{bmatrix}; \quad R = 1$$

An LQR relation similar to equation (19) is written in terms of the state-space model (52) and the above weighting matrices. This gives:

$$\begin{bmatrix} P^h(i\Delta x, j\Delta t) & 0 \\ 0 & P^v(i\Delta x, j\Delta t) \end{bmatrix} = \begin{bmatrix} 100 & Q_2(i\Delta x, j\Delta t) \\ Q_2(i\Delta x, j\Delta t) & 450 \end{bmatrix} + \begin{bmatrix} 0.9561.909 \\ 0.0050.909 \end{bmatrix}' \quad (57)$$

$$\begin{bmatrix} P^h((i+1)\Delta x, j\Delta t) & 0 \\ 0 & P^v(i\Delta x, (j+1)\Delta t) \end{bmatrix} \left( \begin{bmatrix} 0.9561.909 \\ 0.0050.909 \end{bmatrix} - \begin{bmatrix} 0.233 \\ 0.233 \end{bmatrix} G(i\Delta x, j\Delta t) \right)$$

The optimal gains are determined by:

$$G(i\Delta x, j\Delta t) = \Gamma(i\Delta x, j\Delta t) \begin{bmatrix} 0.233 \\ 0.233 \end{bmatrix} P^{11}(i\Delta x, j\Delta t) \begin{bmatrix} 0.9561.909 \\ 0.0050.909 \end{bmatrix}$$

where, $$\Gamma(i\Delta x, j\Delta t) = (1 + 0.0542[P^h((i+1)\Delta x, j\Delta t) \, P^v(i\Delta x, (j+1)\Delta t)])^{-1}$$

Figure 8:
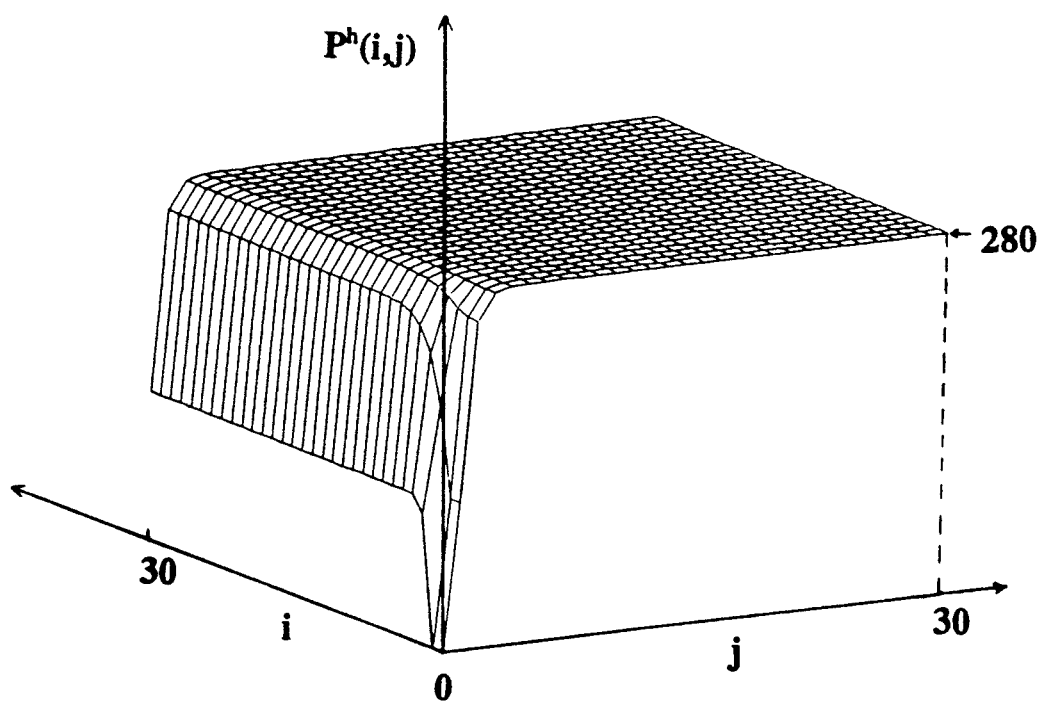
FIG. 8 is a graph of the overall spatial-time propagation of the weighting factor $P^h(i,j)$.
Figure 9:
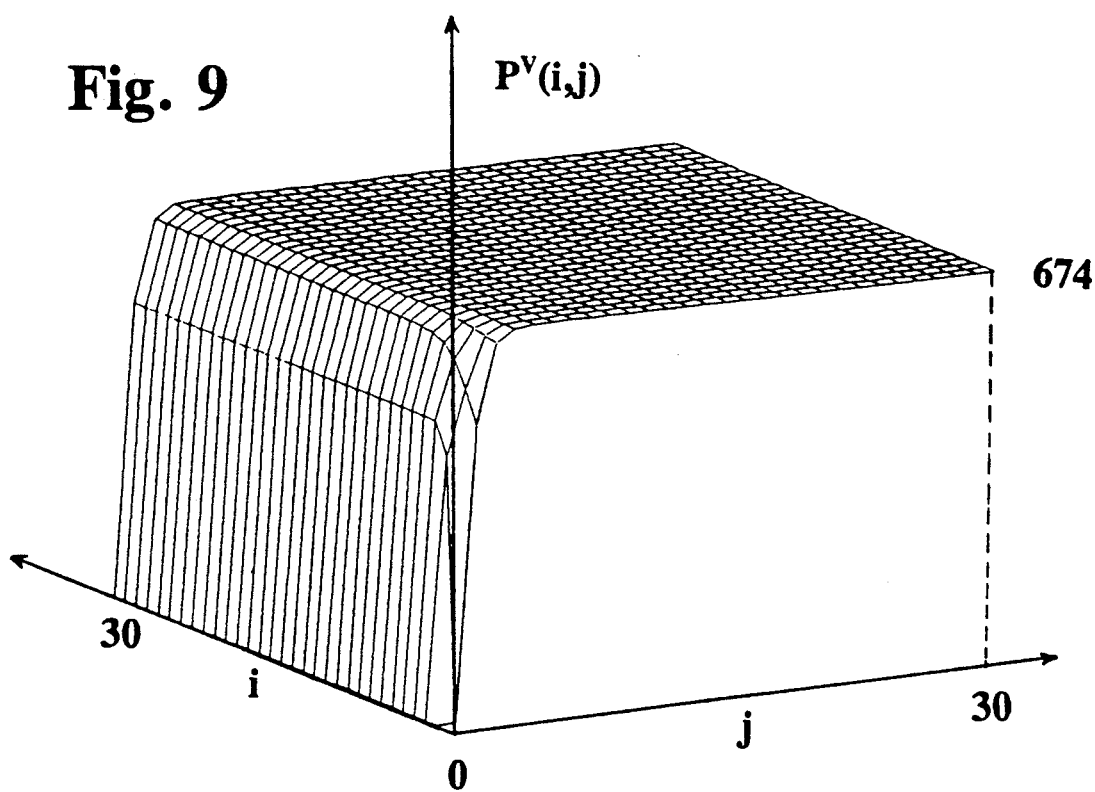
FIG. 9 is a graph of the overall spatial-time propagation of the weighting factor $P^v(i,j)$.
Figure 10:
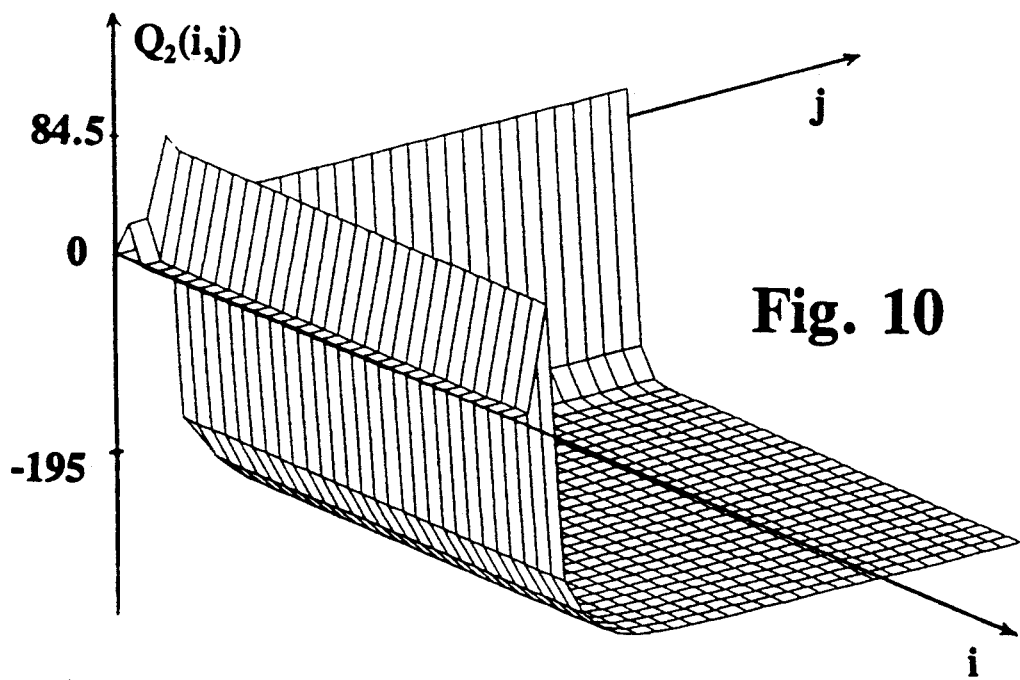
FIG. 10 is a graph of the overall spatial-time propagation of the weighting factor $Q_2(i,j)$.
Figure 11:
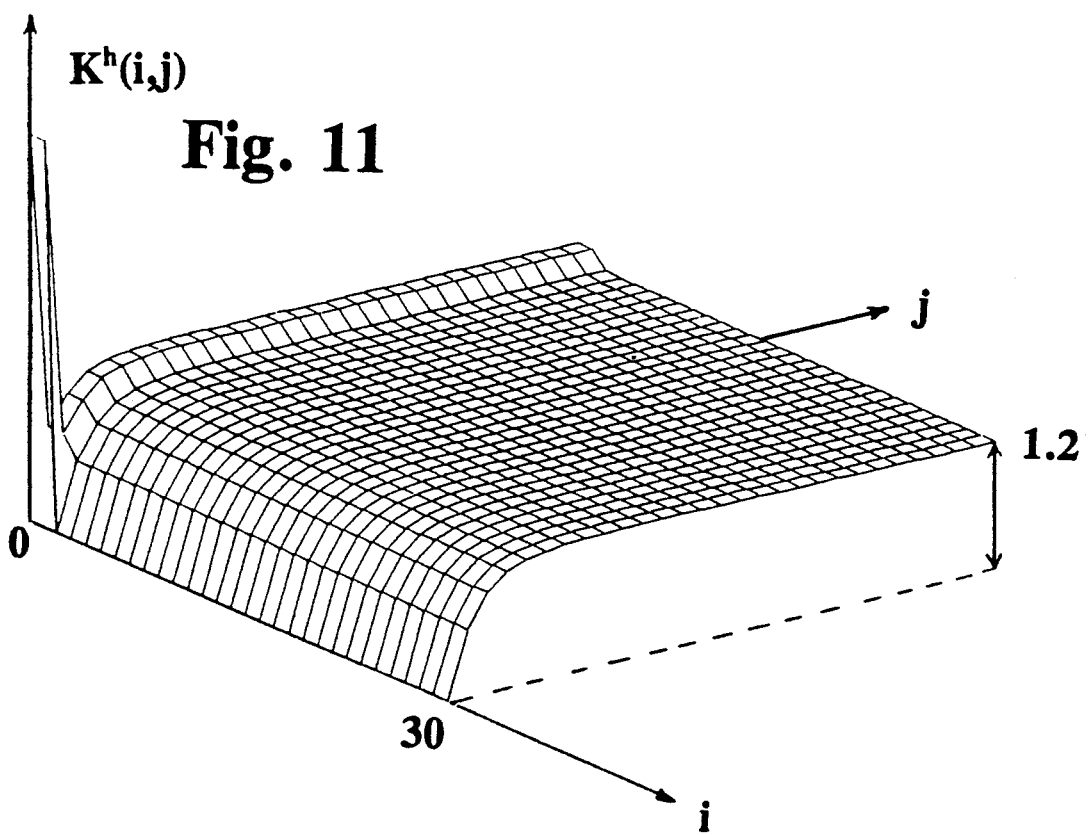
FIG. 11 is a graph of the overall spatial-time variation of the optimal control gain $G^h(i,j)$.
Figure 12:
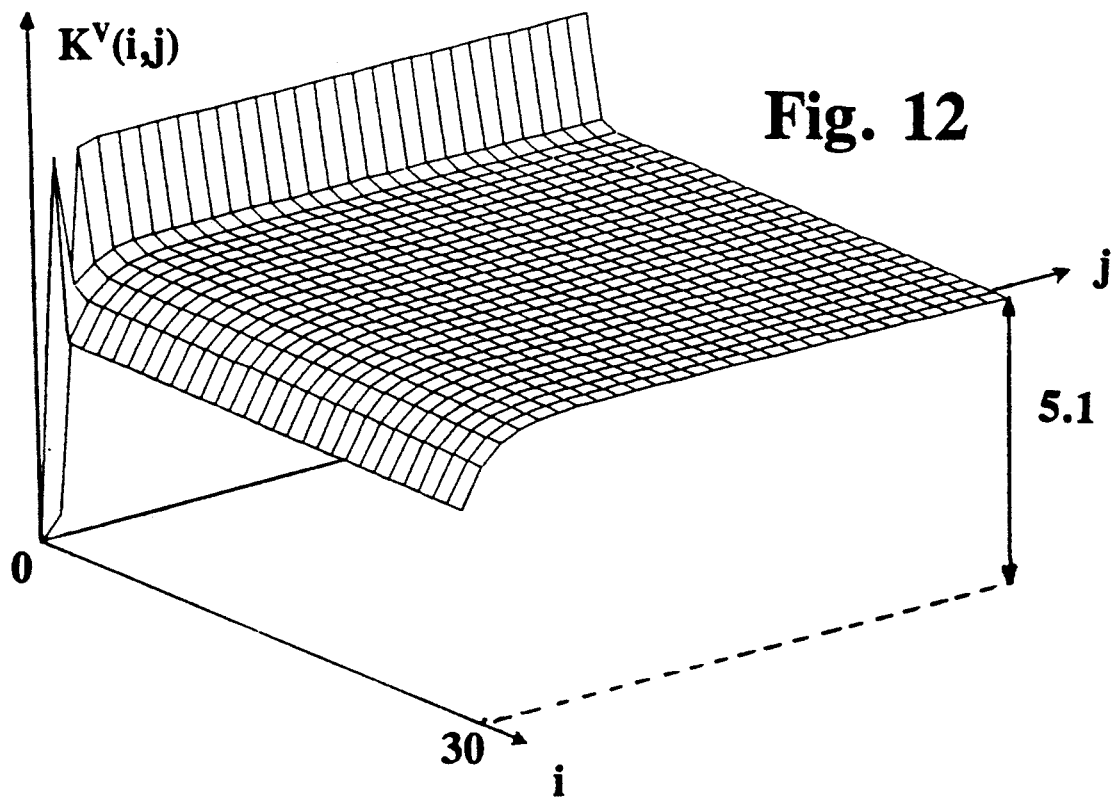
FIG. 12 is a graph of the overall spatial-time variation of the optimal control gain $G^v(i,j)$.
Figure 13:
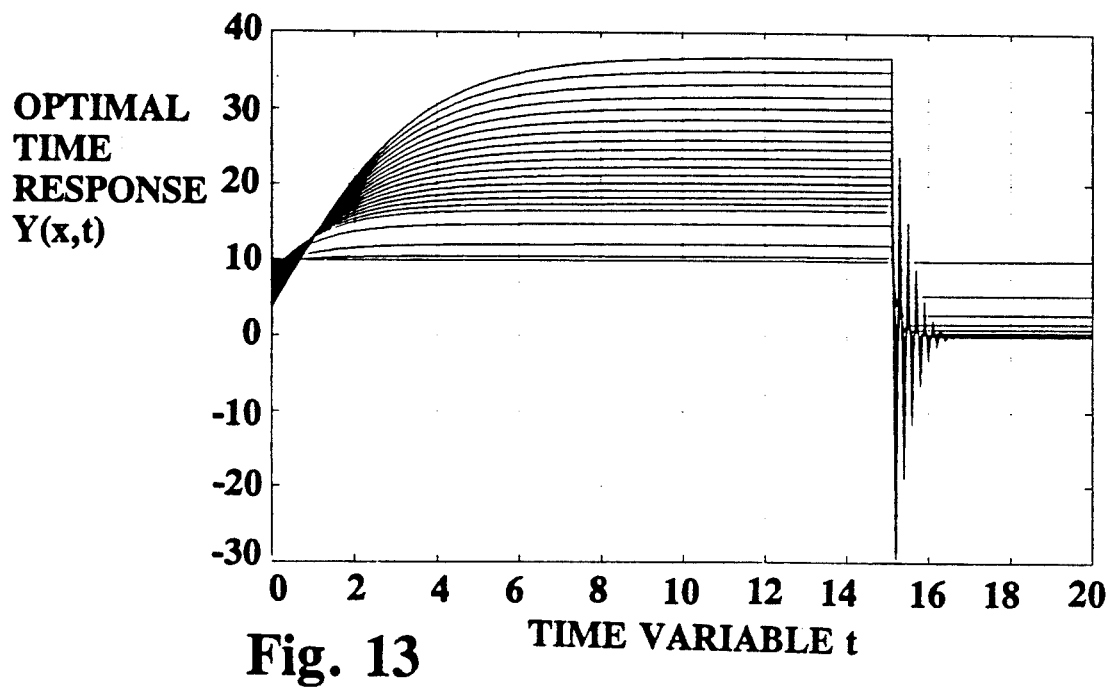
FIG. 13 is a graph of optimally controlled time responses of the distributed parameter system for various spatial samples.
Figure 14:
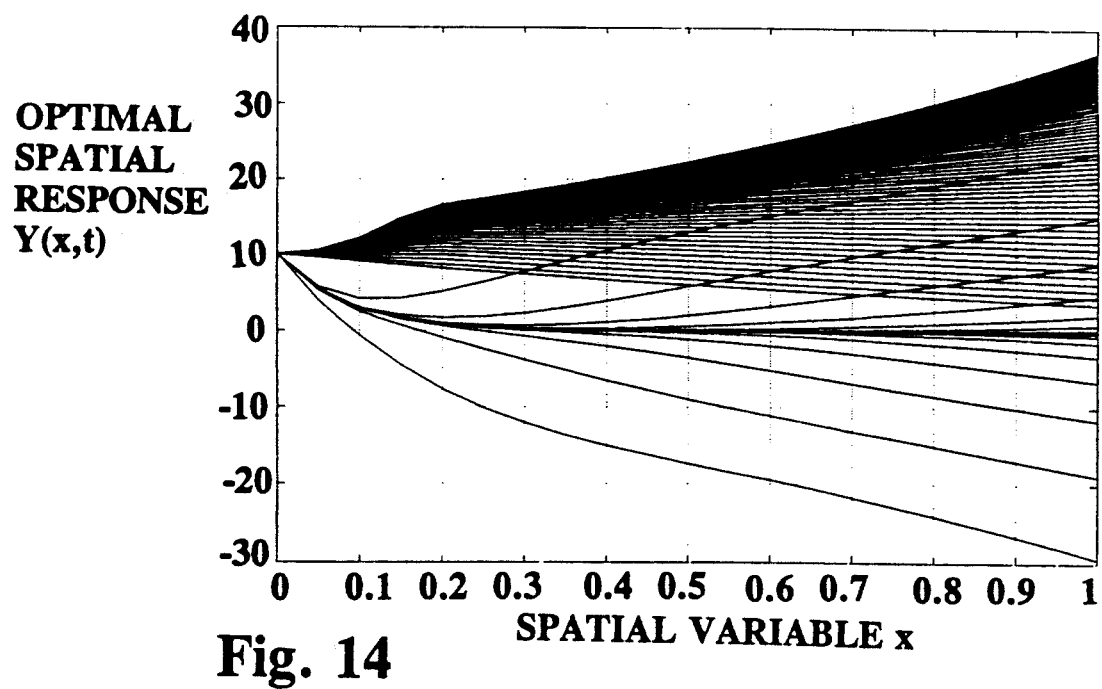
FIG. 14 is a graph of optimally controlled spatial responses of the same system for various time samples.
Figure 15:
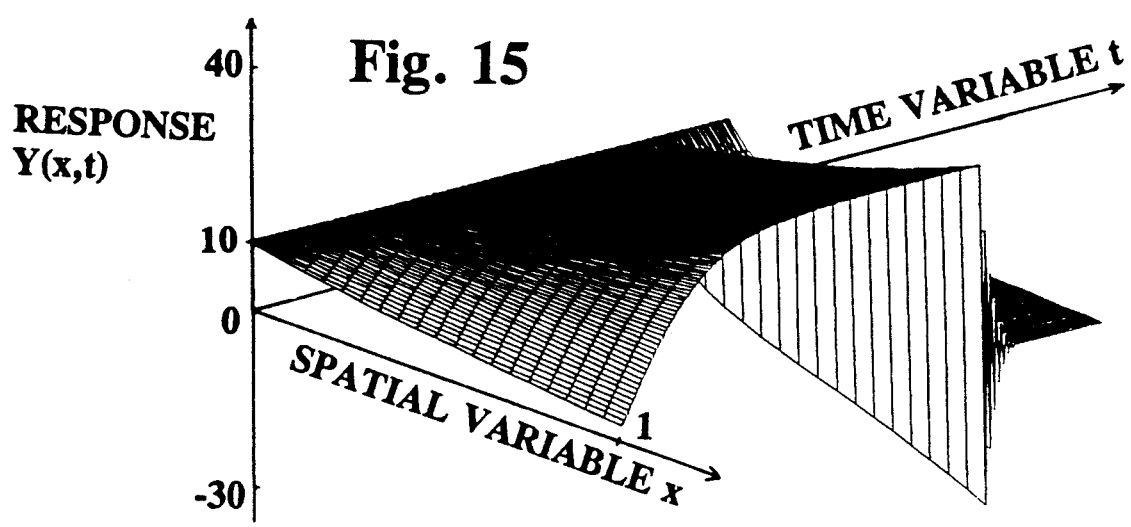
FIGS. 15 and 16 are different views of a three-dimensional graph showing overall optimally controlled spatial-time response of the distributed parameter system.
Figure 16:
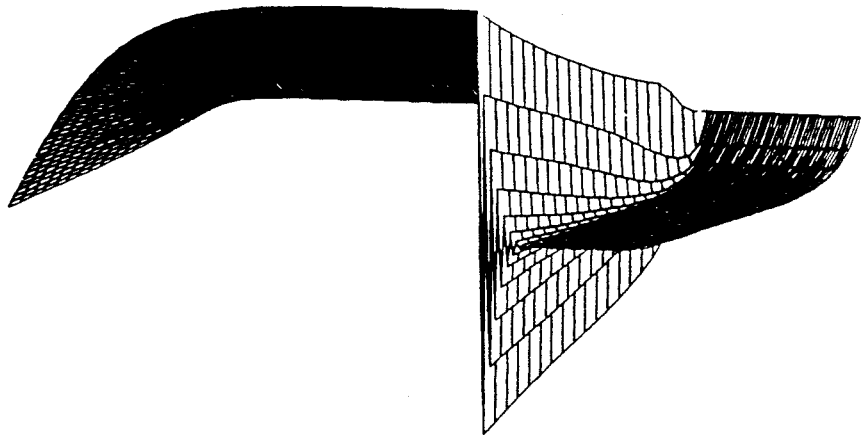

LQR equation (57) is computed recursively by a backward iteration in terms of $P^h(i\Delta, j\Delta)$, $P^v(i\Delta, j\Delta)$ and $Q_2(i\Delta, j\Delta)$. Computation starts by the following initial values for the weighting matrix $P(i\Delta x, j\Delta t)$:
$P^h((i+1)\Delta x, j\Delta t) = 0$ for $i = 21$ and $j = 0, 1, \ldots, 51$
$P^h(20\Delta x, 50\Delta t) = 1$
$P^v(i\Delta x, (j+1)\Delta t) = 0$ for $j = 51$ and $i = 0, 1, \ldots, 21$
$P^v(20\Delta x, 50\Delta t) = 1$
and,
$G(i\Delta x, j\Delta t) = 0$ for $i = 0, 1, \ldots, 21$ and $j = 51; i = 21$ and $j = 0, 1, \ldots, 51;$ $(i,j) = (20, 50)$ FIGS. 8, 9 and 10 illustrate the time and spatial variations of weighting matrices $P^h(i\Delta, j\Delta)$, $P^v(i\Delta, j\Delta)$ and $Q_2(i\Delta, j\Delta)$ by a three-dimensional plot where one axis presents the time, another axis presents the space and the third axis gives the value of the weighting matrix, respectively. The time and spatial responses for the optimal gains $G^h(i\Delta x, j\Delta t)$ and $G^v(i\Delta x, j\Delta t)$ are illustrated by three-dimensional plots, see FIGS. 11 and 12. The optimal gains $G^h(i\Delta x, j\Delta t)$ and $G^v(i\Delta x, j\Delta t)$ will reach their steady-state values within 8 to 12 iterations with respect to each independent variable. The steady-state values of the optimal gains $G^h(i\Delta x, j\Delta t)$ and $G^v(i\Delta x, j\Delta t)$ are denoted by $G^h_{ss}$ and $G^v_{ss}$ and their values are 1.1976 and 5.0699, respectively. The optimal controlled response of the distributed-parameter system (52)–(53) using the optimal quartic controller $G(i\Delta x, j\Delta t)$ as the state-feedback controller are shown in FIGS. 13, 14, 15 and 16. FIGS. 15 and 16 show the same graph, but for the sake of clarity, the view shown in FIG. 16 is rotated 60 degrees to the right in azimuth and down 15 degrees in elevation from the view show in FIG. 15.

APPENDIX B

This appendix contains a copy of a Fortran program which operates to carry out a number of the calculations in accordance with the invention. They are included for the convenience of the Examiner, and will not be included in the specification unless their inclusion is requested or recommended.

```
C*******************************************************************
C*                                                                 *
C*   This program simulates the dynamic behavior of a continuous   *
C*   constant coefficient distributed-parameter system using a     *
C*   multidimensional state-space model.  Also it computes an      *
C*   optimal distributed control law based on a prescribed         *
C*   performance criterion for controlling the dynamic of the      *
C*   system.                                                       *
C*                                                                 *
C*                                                                 *
C*   A discrete state-space model for a distributed-parameter      *
C*   system which is a function of two independent variables is as *
C*   follows:                                                      *
C*                                                                 *
C*   Xh(i+1,j) = A11*Xh(i,j) + A12*Xv(i,j) + B1*U(i,j)              *
C*                                                                 *
C*   Xv(i,j+1) = A21*Xh(i,j) + A22*Xv(i,j) + B2*U(i,j)              *
C*                                                                 *
C*   The output equation of the model is:                          *
C*                                                                 *
C*   Y(i,j) = C1*Xh(i,j) + C2*Xv(i,j) + D*U(i,j)                   *
C*                                                                 *
C*   f(i) = Y(i,0) ; is the initial displacement, for i=0,1,2,...   *
C*                                                                 *
C*   g(j) = Y(0,j) ; is the boundary condition, for j=0,1,2,...     *
C*                                                                 *
C*                            Date: August 15, 1991                *
C*                            Allen Moshfegh                       *
C*                                                                 *
C*******************************************************************
```

```fortran
C
      INTEGER TIMEDIM,SPCDIM,DIM,DIMX,DIMX1,DIMT,DIMT1,TIMEITR,SPCITR
      PARAMETER (SPCDIM=1,TIMEDIM=1,DIM=SPCDIM+TIMEDIM)
      DOUBLE PRECISION A11(SPCDIM,SPCDIM),A12(SPCDIM,TIMEDIM),E(1,1),
     1A21(TIMEDIM,SPCDIM),A22(TIMEDIM,TIMEDIM),B1(SPCDIM,1),F(1,1),
     2B2(TIMEDIM,1),C1(1,SPCDIM),C2(1,TIMEDIM),TC2(TIMEDIM,1)
      DOUBLE PRECISION CTLA11(SPCDIM,SPCDIM),CTLA12(SPCDIM,TIMEDIM),
     1CTLA21(TIMEDIM,SPCDIM),CTLA22(TIMEDIM,TIMEDIM),B11(SPCDIM,SPCDIM)
     2,B12(TIMEDIM,SPCDIM),B21(TIMEDIM,SPCDIM),B22(TIMEDIM,TIMEDIM)
      DOUBLE PRECISION SUM1,SUM2,T1,R,D,X1,Q,PINVC2(TIMEDIM,1),
     1PINVC1(SPCDIM,1),XVV(TIMEDIM,1),XHH(SPCDIM,1),TC1(SPCDIM,1),
     2GH(1,SPCDIM),GV(1,TIMEDIM)
C     X and T are the maximum number of iterations with respect to the
C     spatial and time variables.
      INTEGER X,T
      PARAMETER (X=40)
      PARAMETER (T=80)
      DOUBLE PRECISION XH(X,T,SPCDIM),XV(X,T,TIMEDIM),U(X,T),Y(X,T),
     1F1(X),F(X,1)
      COMMON /STATEV/ XV
      COMMON /OUTY/ Y
      COMMON /STATEH/ XH,U
      WRITE (*,*) 'Enter Sampling Periods For The Spatial Variable x'
      WRITE (*,*) 'And Time Variable t ==> '
      READ (*,*) X1,T1
C
C****************************************************************
C     This is an example of a state-space model for a distributed-
C        parameter system.  Comment the next Eleven statements and
C        uncomment the SOUBROUTINE INMAT if another model is desired.
C     State-Space Model is:
C
      R=4+(2*X1)+(2*T1)-(X1*T1)
      Q = X1*T1/R
      A11(1,1)=(4-(2*X1)+(2*T1)+(X1*T1))/R
      A12(1,1)=(8+4*X1)/R
      A21(1,1)=8*X1*T1/(R*(2+X1))
      A22(1,1)=(4+(2*X1)-(2*T1)+(T1*X1))/R
      B1(1,1)=1/R
      B2(1,1)=1/R
      C1(1,1)=Q*(8+(4*T1))
      C2(1,1)=Q*(8+(4*X1))
      D=Q
C
C     CALL INMAT (A11,A12,A21,A22,B1,B2,C1,C2,D,SPCDIM,TIMEDIM)
C****************************************************************
C     Write a routine to describe the initial conditions, like the one
C     given below:
C
      CALL DISFUN (F1,X1,SPCITR)
C     WRITE (*,1) (I,F1(I),I =1, SPCITR)
1     FORMAT (1X, I3, 3X, F9.4)
      DO 2 I= 1, SPCITR
        F(I,1)=F1(I)
2     CONTINUE
C
C  The initial STATE conditions of the model are determined next!
      DO 900 I=1, SPCDIM
        XH(1,1,I) = 0.0
900   CONTINUE
C     C2'(C2*C2')^(-1)
      CALL MTRS (C2,TC2,1,TIMEDIM)
      CALL MPROD (C2,TC2,E,1,TIMEDIM,1)
      E(1,1)=1/E(1,1)
      CALL MSPROD (TC2,E,PINVC2,TIMEDIM,1)
      CALL MPROD (PINVC2,F,XVV,TIMEDIM,1,1)
C     C1'(C1*C1')^(-1)
      CALL MTRS (C1,TC1,1,SPCDIM)
      CALL MPROD (C1,TC1,E,1,SPCDIM,1)
      E(1,1)=1/E(1,1)
```

```
      CALL MSPROD (TC1,E,PINVC1,SPCDIM,1)
      DO 910 I=1, TIMEDIM
       XV(1,1,I) = XVV(I,1)
 910  CONTINUE
      DO 1000 I = 1, SPCITR
        DO 1200 DIMX= 1, SPCDIM
        SUM1= 0.0
        DO 1210 DIMT= 1, TIMEDIM
          SUM1= SUM1+(A12(DIMX,DIMT)*XV(I,1,DIMT))
1210    CONTINUE
        SUM2= 0.0
         DO 1220 DIMX1= 1, SPCDIM
          SUM2= SUM2+(A11(DIMX,DIMX1)*XH(I,1,DIMX1))
1220    CONTINUE
        XH(I+1,1,DIMX)= SUM1+SUM2
        XHH(DIMX,1)= SUM1+SUM2
1200    CONTINUE
              CALL MPROD(C1,XHH,E1,1,SPCDIM,1)
       E1(1,1)= F(I+1,1)-E1(1,1)
              CALL MPROD (PINVC2,E1,XVV,TIMEDIM,1,1)
       DO 1010 I1=1, TIMEDIM
        XV(I+1,1,I1) = XVV(I1,1)
1010    CONTINUE
C     WRITE(*,*) XH(I,1,1),XV(I,1,1)
1000 CONTINUE
C
C         The boundary STATE are determined next!
C
      WRITE(*,*) 'Enter the number of TIME-iterations, as it presents'
      WRITE(*,*) 'the total time when controller is off:'
      WRITE(*,*) ' '
      READ(*,*) TIMEITR
      WRITE(*,*)' '
      WRITE(*,*) 'Total Time of Uncontrolled response is: '
      WRITE(*,*) TIMEITR*T1,'Units of Time'
      WRITE(*,*)' '
      DO 2000 I = 1, T-1
        DO 2200 DIMT= 1, TIMEDIM
        SUM1= 0.0
         DO 2210 DIMT1= 1, TIMEDIM
          SUM1= SUM1 + (A22(DIMT,DIMT1) * XV(1,I,DIMT1))
2210    CONTINUE
        SUM2= 0.0
        DO 2220 DIMX= 1, SPCDIM
          SUM2= SUM2 + (A21(DIMT,DIMX) * XH(1,I,DIMX))
2220    CONTINUE
        XV(1,I+1,DIMT)= SUM1 + SUM2
        XVV(DIMT,1)= SUM1+SUM2
2200    CONTINUE
C
C*******************************************************************
C     Write a routine to describe the boundary function; for this
C     problem the boundary function is constant and is defined as g(0,t)=10.
C
              CALL MPROD(C2,XVV,E1,1,TIMEDIM,1)
C     g(0,t) = 10.0
        E1(1,1)= 10.0-E1(1,1)
              CALL MPROD (PINVC1,E1,XHH,SPCDIM,1,1)
        DO 2010 I1=1, SPCDIM
         XH(1,I+1,I1) = XHH(I1,1)
2010    CONTINUE
2000 CONTINUE
C
      CALL INPUT (U,SPCITR,TIMEITR)
C     Uncontrolled Response is:
C
        DO 3000 J= 1, TIMEITR
        DO 3100 I= 1, SPCITR
         SUM1= 0.0
         DO 3110 DIMT= 1, TIMEDIM
           SUM1= SUM1 + (C2(1,DIMT) * XV(I,J,DIMT))
```

```
3110        CONTINUE
            SUM2= 0.0
            DO 3120 DIMX1= 1, SPCDIM
             SUM2= SUM2+(C1(1,DIMX1)*XH(I,J,DIMX1))
3120        CONTINUE
            Y(I,J)= SUM1+SUM2+(D*U(I,J))
            DO 3200 DIMX= 1, SPCDIM
            SUM1= 0.0
             DO 3210 DIMT= 1, TIMEDIM
              SUM1= SUM1+(A12(DIMX,DIMT)*XV(I,J,DIMT))
3210        CONTINUE
            SUM2= 0.0
             DO 3220 DIMX1= 1, SPCDIM
              SUM2= SUM2+(A11(DIMX,DIMX1)*XH(I,J,DIMX1))
3220        CONTINUE
            XH(I+1,J,DIMX)= SUM1+SUM2+(B1(DIMX,1)*U(I,J))
3200        CONTINUE
            DO 3300 DIMT= 1, TIMEDIM
            SUM1= 0.0
             DO 3310 DIMT1= 1, TIMEDIM
              SUM1= SUM1+(A22(DIMT,DIMT1)*XV(I,J,DIMT1))
3310        CONTINUE
            SUM2= 0.0
             DO 3320 DIMX= 1, SPCDIM
              SUM2= SUM2+(A21(DIMT,DIMX)*XH(I,J,DIMX))
3320        CONTINUE
            XV(I,J+1,DIMT)= SUM1+SUM2+(B2(DIMT,1)*U(I,J))
3300        CONTINUE
3100     CONTINUE
3000  CONTINUE
C
C     Optimal Controlled Response is:
C
      CALL OPCONTRL (A11,A12,A21,A22,B1,B2,GH,GV,SPCDIM,TIMEDIM,DIM)
C
      WRITE(*,*) 'The total time when optimal controller is on-line:'
      WRITE(*,*)  (T-1-TIMEITR)*T1,'Units of Time'
      WRITE(*,*)' '
C
      CALL MPROD (B1,GH,B11,SPCDIM,1,SPCDIM)
      CALL MPROD (B1,GV,B12,SPCDIM,1,TIMEDIM)
      CALL MPROD (B2,GH,B21,TIMEDIM,1,SPCDIM)
      CALL MPROD (B2,GV,B22,TIMEDIM,1,TIMEDIM)
      CALL MSUB (A11,B11,CTLA11,SPCDIM,SPCDIM)
      CALL MSUB (A12,B12,CTLA12,SPCDIM,TIMEDIM)
      CALL MSUB (A21,B21,CTLA21,TIMEDIM,SPCDIM)
      CALL MSUB (A22,B22,CTLA22,TIMEDIM,TIMEDIM)
      DO 4000 J= TIMEITR, T-1
       DO 4100 I= 1, SPCITR
        SUM1= 0.0
        DO 4110 DIMT= 1, TIMEDIM
         SUM1= SUM1+(C2(1,DIMT)*XV(I,J,DIMT))
4110    CONTINUE
        SUM2= 0.0
        DO 4120 DIMX1= 1, SPCDIM
         SUM2= SUM2+(C1(1,DIMX1)*XH(I,J,DIMX1))
4120    CONTINUE
        Y(I,J)= SUM1+SUM2+(D*U(I,J))
        DO 4200 DIMX= 1, SPCDIM
        SUM1= 0.0
         DO 4210 DIMT= 1, TIMEDIM
          SUM1= SUM1+(CTLA12(DIMX,DIMT)*XV(I,J,DIMT))
4210    CONTINUE
        SUM2= 0.0
         DO 4220 DIMX1= 1, SPCDIM
          SUM2= SUM2+(CTLA11(DIMX,DIMX1)*XH(I,J,DIMX1))
4220    CONTINUE
        XH(I+1,J,DIMX)= SUM1+SUM2+(B1(DIMX,1)*U(I,J))
4200    CONTINUE
        DO 4300 DIMT= 1, TIMEDIM
        SUM1= 0.0
```

```fortran
             DO 4310 DIMT1= 1, TIMEDIM
               SUM1= SUM1+(CTLA22(DIMT,DIMT1)*XV(I,J,DIMT1))
4310         CONTINUE
             SUM2= 0.0
             DO 4320 DIMX= 1, SPCDIM
               SUM2= SUM2+(CTLA21(DIMT,DIMX)*XH(I,J,DIMX))
4320         CONTINUE
             XV(I,J+1,DIMT)= SUM1+SUM2+(B2(DIMT,1)*U(I,J))
4300      CONTINUE
4100    CONTINUE
4000  CONTINUE
C     DO 31 K= 1, SPCITR
      K=SPCITR
C     WRITE (*,1) (I,Y(K,I),I= 1,T-1)
C31   CONTINUE
      STOP
      END
C
C*****************************************************************
C     This is a function routine for the initial condition.
C
      SUBROUTINE DISFUN (F,SPCSAM,NUMSAM)
C
      INTEGER NUMSAM
      DOUBLE PRECISION LENGTH,SPCSAM,J,F(*)
      WRITE (*,*) 'Enter the total length for the spatial variable '
      WRITE(*,*) 'for example, x = L  where L is the total length ==>'
      WRITE(*,*) ' '
      READ (*,*)  LENGTH
      J =LENGTH/SPCSAM
      NUMSAM =IDNINT(J)+1
      WRITE (*,*) 'Number Of Sample Points In The Spatial Direction
     1Are', NUMSAM
      DO 10 I =1, NUMSAM
       F(I) =10*EXP(-(I-1)*SPCSAM)
10    CONTINUE
      RETURN
      END
C
C*****************************************************************
C*    This routine is for setting up the discrete state-space model: *
C*                                                                   *
C*    A discrete state-space model for a distributed-parameter       *
C*    system which is a function of two independent variables is as  *
C*    follows:                                                       *
C*                                                                   *
C*    Xh(i+1,j) = A11*Xh(i,j) + A12*Xv(i,j) + B1*U(i,j)               *
C*                                                                   *
C*    Xv(i,j+1) = A21*Xh(i,j) + A22*Xv(i,j) + B2*U(i,j)               *
C*                                                                   *
C*    The output equation of the model is:                           *
C*                                                                   *
C*    Y(i,j) = C1*Xh(i,j) + C2*Xv(i,j) + D*U(i,j)                    *
C*                                                                   *
C*****************************************************************
C
      SUBROUTINE INMAT (A11,A12,A21,A22,B1,B2,C1,C2,D,N,M)
C
      INTEGER N,M
      DOUBLE PRECISION A11(N,N),A12(N,M),A21(M,N),A22(M,M),C1(1,N),
     1C2(1,M),B1(N,1),B2(M,1),D
C
      WRITE (*,*) 'Enter Each Matrix By Its Rows.'
      WRITE(*,*) ' '
      WRITE (*,*) 'Enter Matrix A11 ====>'
      DO 10 I = 1, N
        DO 11 J = 1, N
          READ (*,*) A11(I,J)
11      CONTINUE
10    CONTINUE
```

```
      WRITE (*,*) 'Enter Matrix A12 ====>'
      DO 20 I = 1, N
        DO 21 J = 1, M
          READ (*,*) A12(I,J)
21      CONTINUE
20    CONTINUE
      WRITE (*,*) 'Enter Matrix A21 ====>'
      DO 30 I = 1, M
        DO 31 J = 1, N
          READ (*,*) A21(I,J)
31      CONTINUE
30    CONTINUE
      WRITE (*,*) 'Enter Matrix A22 ====>'
      DO 40 I = 1, M
        DO 41 J = 1, M
          READ (*,*) A22(I,J)
41      CONTINUE
40    CONTINUE
      WRITE (*,*) 'Enter Matrix B1 ====>'
      DO 50 I = 1, N
         READ (*,*) B1(I,1)
50    CONTINUE
      WRITE (*,*) 'Enter Matrix B2 ====>'
      DO 60 I = 1, M
         READ (*,*) B2(I,1)
60    CONTINUE
      WRITE (*,*) 'Enter Matrix C1 ====>'
      DO 70 I = 1, N
         READ (*,*) C1(1,I)
70    CONTINUE
      WRITE (*,*) 'Enter Matrix C2 ====>'
      DO 80 I = 1, M
         READ (*,*) C2(1,I)
80    CONTINUE
      WRITE (*,*) 'Enter D (Scalar) ====>'
         READ (*,*) D
      RETURN
      END
C
C*******************************************************************
C*    This routine is for setting up the discrete input function   *
C*******************************************************************
C
      SUBROUTINE INPUT (V,L,T)
      INTEGER L,T
      DIMENSION V(L,T)
      DOUBLE PRECISION V
      DO 1 I=1, T
        DO 2 J=1, L
        V(J,I)=0.0
2       CONTINUE
1     CONTINUE
      RETURN
      END
C
C*******************************************************************
C*    This is a matrix multiplication routine                      *
C*                                                                 *
C*       ========>    C=A*B    <==========                         *
C*******************************************************************
C
      SUBROUTINE MPROD (A,B,C,N,M,L)
C
      INTEGER N,M,L
      DIMENSION A(N,M), B(M,L), C(N,L)
      DOUBLE PRECISION A,B,C,SUM
      DO 1 I=1, L
       DO 2 J=1, N
       SUM=0.
        DO 3 K=1, M
        SUM=SUM+(A(J,K)*B(K,I))
```

```
3       CONTINUE
        C(J,I)=SUM
2       CONTINUE
1       CONTINUE
        RETURN
        END
C
C********************************************************************
C*   This is a matrix subtraction routine                           *
C*                                                                  *
C*       =======>    C=A-B    <=========                            *
C********************************************************************
C
        SUBROUTINE MSUB (A,B,C,N,M)
C
        INTEGER N,M
        DIMENSION A(N,M), B(N,M), C(N,M)
        DOUBLE PRECISION A,B,C
        DO 1 I=1, N
         DO 2 J=1, M
          C(I,J)=A(I,J)-B(I,J)
2        CONTINUE
1       CONTINUE
        RETURN
        END
C
C********************************************************************
C*   This is a matrix addition routine                              *
C*                                                                  *
C*       =======>    C=A+B    <=========                            *
C********************************************************************
C
        SUBROUTINE MSUM (A,B,C,N,M)
C
        INTEGER N,M
        DIMENSION A(N,M), B(N,M), C(N,M)
        DOUBLE PRECISION A,B,C
        DO 1 I=1, N
         DO 2 J=1, M
          C(I,J)=A(I,J)+B(I,J)
2        CONTINUE
1       CONTINUE
        RETURN
        END
C
C********************************************************************
C*   This is a matrix-scalar multiplication routine                 *
C*                                                                  *
C*       =======>    C=b*A    <=========                            *
C********************************************************************
C
        SUBROUTINE MSPROD (A,B,C,N,L)
C
        INTEGER N,L
        DIMENSION A(N,L), C(N,L)
        DOUBLE PRECISION A,B,C
        DO 1 J=1, L
         DO 2 K=1, N
          C(K,J)=A(K,J)*B
2        CONTINUE
1       CONTINUE
        RETURN
        END
C
C********************************************************************
C*   This is a matrix transpose routine                             *
C*                                                                  *
C*       A    ----->    A'                                          *
C********************************************************************
C
        SUBROUTINE MTRS (A,B,N,M)
```

```fortran
C
      INTEGER M, N
      DIMENSION A(N,M), B(M,N)
      DOUBLE PRECISION A,B
C
      DO 1 I=1,N
       DO 2 J=1,M
         B(J,I)=A(I,J)
2      CONTINUE
1     CONTINUE
      RETURN
      END
C
C*********************************************************************
C*                                                                   *
C*                                                                   *
C*   This Subroutine Provides A Set of Optimal Feedback Gains for The *
C*   State-Space Model of The Discrete Distributed-Parameter System. *
C*                                                                   *
C*      For Example, State-Space Model is:                           *
C*                                                                   *
C*      Xh(i+1,j) = A11*Xh(i,j) + A12*Xv(i,j) + B1*U(i,j)            *
C*                                                                   *
C*      Xv(i,j+1) = A21*Xh(i,j) + A22*Xv(i,j) + B2*U(i,j)            *
C*                                                                   *
C*                                                                   *
C*      System's Output is:                                          *
C*                                                                   *
C*      Y(i,j) = C1*Xh(i,j) + C2*Xv(i,j) + D*U(i,j)                  *
C*                                                                   *
C*      The Optimal Feedback Controller is:                          *
C*                                                                   *
C*      Uo(i,j) = -Gh(i,j)*Xh(i,j) -Gv(i,j)*Xv(i,j)                  *
C*                                                                   *
C*                                                                   *
C*                                                                   *
C*      IMPORTANT REMARK:                                            *
C*                                                                   *
C*      The weighting matrices P(i,j), Q(i,j) and R  MUST BE POSITIVE *
C*                                                                   *
C*      DEFINITE SYMMETRIC AND REAL                                  *
C*                                                                   *
C*                                 Date: August 15, 1991             *
C*                                       Allen Moshfegh              *
C*                                                                   *
C*********************************************************************
C
      SUBROUTINE OPCONTRL (A11,A12,A21,A22,B1,B2,GH,GV,SPCDIM,TIMEDIM
     1,DIM)
      INTEGER TIMEDIM,SPCDIM,DIM,DIMX,DIMX1,DIMT,DIMT1,TIMEITR,SPCITR
C    O is equal to M+N
      INTEGER M,N,O,I,II,J
      PARAMETER (M=1,N=1,O=N+M)
      DOUBLE PRECISION A11(N,N),A12(N,M),A21(M,N),A22(M,M),B1(N,1),
     1B2(M,1),GH(1,N),GV(1,M),R,A(O,O),B(O,1),AT(O,O),BT(1,O)
C    Spatial and Time iterations
      INTEGER X,T
      PARAMETER (X=30,T=30)
      DOUBLE PRECISION PH(X,T,N,N),PV(X,T,M,M),Qhh(N,N),Qvv(M,M),
     1Qhv(X,T,N,M),Qvh(X,T,M,N),P(O,O),Q(O,O)
C
      DOUBLE PRECISION HH2(N,M),HH3(M,N),E(1,1),HH1(N,N),HH4(M,M),
     1H(O,O),D1(O,O),D2(O,O),HH(O,O),C(1,O),D(1,O),K2(1,O),KH(X,T,1,N)
     2,KV(X,T,1,M),P1(N,N),P2(M,M),Qhv1(N,M),Qvh1(M,N)
      COMMON /GAINV/ KV,PV
      COMMON /GAINH/ KH,PH,QHV
      WRITE(*,*) ' '
      WRITE(*,*) 'Enter The Desired Number Of Spatial & Time Iterations'
      WRITE(*,*) 'For Computing The Optimal Feedback Gains.  Iterations'
      WRITE(*,*) 'Must Be Smaller Or Equal To ===>',X,T
      WRITE(*,*) ' '
```

```
      WRITE(*,*) 'Now Enter The Number Of Spatial Iterations ===> '
      READ(*,*) SPCITR
      WRITE(*,*) ' '
      WRITE(*,*) 'And Enter The Number Of Time Iterations ===> '
      READ(*,*)  TIMEITR
C
C Set the initial conditions of the two-dimensional weightiing
C matrix P(i,j) to ZERO for (i=1, all j's) and (all i's , j=1).
C Assign arbitrary values to Ph(2,1) and Pv(1,2).
C
      DO 1000 I= 1, SPCITR
        DO 1010 DIMT= 1, TIMEDIM
          DO 1020 DIMT1= 1, TIMEDIM
          PV(I,1,DIMT,DIMT1)= 0.0
1020    CONTINUE
1010   CONTINUE
1000 CONTINUE
C
      DO 1100 I= 1, TIMEITR
        DO 1110 DIMX= 1, SPCDIM
          DO 1120 DIMX1= 1, SPCDIM
          PH(1,I,DIMX,DIMX1)= 0.0
1120    CONTINUE
1110   CONTINUE
1100 CONTINUE
C
      DO 1030 I=1, TIMEITR
        DO 1011 DIMT= 1, TIMEDIM
          DO 1021 DIMX= 1, SPCDIM
          Qhv(1,I,DIMX,DIMT)= 0.0
1021    CONTINUE
1011   CONTINUE
1030 CONTINUE
C
      DO 1032 I=1, SPCITR
        DO 1012 DIMT= 1, TIMEDIM
          DO 1022 DIMX= 1, SPCDIM
          Qvh(I,1,DIMT,DIMX)= 0.0

1022    CONTINUE
1012   CONTINUE
1032 CONTINUE
C
      DO 1042 DIMT= 1, TIMEDIM
        DO 1041 DIMX= 1, SPCDIM
          Qvh(2,1,DIMT,DIMX)= 0.0
          Qvh(1,2,DIMT,DIMX)= 0.0
1041    CONTINUE
1042   CONTINUE
C
      DO 1051 DIMT= 1, TIMEDIM
        DO 1052 DIMX= 1, SPCDIM
          Qhv(2,1,DIMX,DIMT)= 0.0
          Qhv(1,2,DIMX,DIMT)= 0.0
1052    CONTINUE
1051   CONTINUE
C
      WRITE(*,*) ' ********   IMPORTANT REMARK!   ********        '
                                *
      WRITE(*,*) ' '
      WRITE(*,*) 'The FOLLOWING weighting matrices Ph(i,j), Pv(i,j),'
      WRITE(*,*) 'Qhh(i,j), Qvv(i,j) and R  MUST BE POSITIVE DEFINITE'
      WRITE(*,*) 'SYMMETRIC AND REAL!'
      WRITE(*,*) ' '
      WRITE(*,*) ' Enter initial value of matrix Ph  ==> '
      DO 1200 I= 1, SPCDIM
        DO 1210 J= 1, SPCDIM
          READ(*,*) PH(2,1,I,J)
          P1(I,J)=PH(2,1,I,J)
1210   CONTINUE
1200 CONTINUE
```

```
c
      WRITE(*,*) ' Enter initial value of matrix Pv   ==> '
      DO 1220 I= 1, TIMEDIM
       DO 1230 J= 1, TIMEDIM
        READ(*,*) PV(1,2,I,J)
        P2(I,J)=PV(1,2,I,J)
1230   CONTINUE
1220  CONTINUE
c
      WRITE(*,*) ' Enter Weighting Matrix Qhh   ==> '
      DO 1240 I= 1, SPCDIM
       DO 1250 J= 1, SPCDIM
        READ(*,*) Qhh(I,J)
1250   CONTINUE
1240  CONTINUE
c
      WRITE(*,*) ' Enter Weighting Matrix Qvv   ==> '
      DO 1260 I= 1, TIMEDIM
       DO 1270 J= 1, TIMEDIM
        READ(*,*) Qvv(I,J)
1270   CONTINUE
1260  CONTINUE
c
      WRITE(*,*) ' Enter The Input Weighting Factor R   ==> '
      READ(*,*) R
c
      CALL VCOMPACT (B,B1,B2,DIM,SPCDIM,TIMEDIM,1)
      CALL MTRS (B,BT,DIM,1)
      CALL MCOMPACT (A,A11,A12,A21,A22,DIM,SPCDIM,TIMEDIM)
      CALL MTRS (A,AT,DIM,DIM)
c
c  FIND GAMMA=1/(R+B'PB)
c
      DO 3000 J= 1, TIMEITR
       DO 4000 II= 1, SPCITR
       IF (J .EQ. 1) THEN
         I=II+1
       ELSE
         I=II
       ENDIF
c
      DO 4001 DIMX=1, SPCDIM
       DO 4002 DIMX1=1, SPCDIM
        P1(DIMX,DIMX1)=PH(I,J,DIMX,DIMX1)
4002   CONTINUE
4001  CONTINUE
c
      DO 4003 DIMT=1, TIMEDIM
       DO 4004 DIMT1=1, TIMEDIM
        P2(DIMT,DIMT1)=PV(I,J,DIMT,DIMT1)
4004   CONTINUE
4003  CONTINUE
c
      CALL DCOMPACT (P,P1,P2,DIM,SPCDIM,TIMEDIM)
c
           CALL MPROD (BT,P,C,1,DIM,DIM)
         CALL MPROD (C,B,E,1,DIM,1)
         E(1,1)=1/(E(1,1)+R)
c
c   K(k) = E * [ TGAMMA * P(k+1) * PHI ]
c
         CALL MPROD (C,A,D,1,DIM,DIM)
         CALL MSPROD (D,E,K2,1,DIM)
c  The optimal gains are KH and KV
        DO 7 I1=1,SPCDIM
          KH(I,J,1,I1)=K2(1,I1)
7       CONTINUE
        DO 8 I1=1,TIMEDIM
          KV(I,J,1,I1)=K2(1,SPCDIM+I1)
8       CONTINUE
c
```

```
C     P(k) = Q + TPHI*P(k+1)*[PHI - {GAMMA*K(k)}]
C
      CALL MPROD (AT,P,H,DIM,DIM,DIM)
      CALL MPROD (B,K2,D1,DIM,1,DIM)
      CALL MSUB (A,D1,D2,DIM,DIM)
      CALL MPROD (H,D2,HH,DIM,DIM,DIM)
      CALL MDCOMP (HH,HH1,HH2,HH3,HH4,DIM,SPCDIM,TIMEDIM)
      CALL MSUM (Qhh,HH1,P1,SPCDIM,SPCDIM)
      CALL MSUM (Qvv,HH4,P2,TIMEDIM,TIMEDIM)
      CALL MCOPY (-HH2,Qhv1,SPCDIM,TIMEDIM)
      CALL MTRS (Qhv1,Qvh1,SPCDIM,TIMEDIM)
C
      DO 4031 DIMX=1, SPCDIM
       DO 4032 DIMX1=1, SPCDIM
        PH(I+1,J,DIMX,DIMX1)=P1(DIMX,DIMX1)
4032   CONTINUE
4031  CONTINUE
C
      DO 4033 DIMT=1, TIMEDIM
       DO 4034 DIMT1=1, TIMEDIM
        PV(I,J+1,DIMT,DIMT1)=P2(DIMT,DIMT1)
4034    CONTINUE
4033    CONTINUE
      DO 4231 DIMX=1, SPCDIM
       DO 4232 DIMT=1, TIMEDIM
        Qhv(I+1,J,DIMX,DIMT)=Qhv1(DIMX,DIMT)
4232  CONTINUE
4231  CONTINUE
      DO 4331 DIMX=1, SPCDIM
       DO 4332 DIMT=1, TIMEDIM
        Qvh(I,J+1,DIMT,DIMX)=Qvh1(DIMT,DIMX)
4332    CONTINUE
4331  CONTINUE
C
      CALL MCOMPACT (Q,Qhh,Qhv1,Qvh1,Qvv,DIM,SPCDIM,TIMEDIM)
      CALL DCOMPACT (P,P1,P2,DIM,SPCDIM,TIMEDIM)
4000  CONTINUE
3000  CONTINUE
C
      DO 5001 I=1,SPCDIM
        GH(1,I)=KH(SPCITR,TIMEITR,1,I)
5001  CONTINUE
      DO 5002 I=1,TIMEDIM
        GV(1,I)=KV(SPCITR,TIMEITR,1,I)
5002  CONTINUE
      WRITE(*,*) 'Optimal Gains are:'
      WRITE(*,*) 'GH ==>',(GH(1,I), I=1,SPCDIM)
      WRITE(*,*) 'GV ==>',(GV(1,I), I=1,TIMEDIM)
      WRITE(*,*) '---------------------------------------------'
      WRITE(*,*) 'Optimal Gain Matrices are:'
      DO 5004 I=1,TIMEITR
C     WRITE(*,*) I
      DO 5003 J=1,SPCITR
C     WRITE(*,2) KV(J,I,1,1)
C     WRITE(*,2) KH(J,I,1,1)
5003  CONTINUE
5004   CONTINUE
      DO 5014 I=1,TIMEITR
      WRITE(*,*) I
      DO 5013 J=1,SPCITR
      WRITE(*,2) Qhv(J,I,1,1)
5013  CONTINUE
5014   CONTINUE
      DO 5005 J=1,DIM
C     WRITE(*,*) 'Q ==>',(Q(J,I), I=1,DIM)
5005  CONTINUE
      WRITE(*,*) '---------------------------------------------'
2     FORMAT (F9.4)
      RETURN
      END
C
```

```
C*****************************************************************
C*    This routine generates a unit matrix                        *
C*                                                                *
C*              A = I                                             *
C*****************************************************************
C
      SUBROUTINE MUNIT (A,N)
      DIMENSION A(N,N)
      INTEGER N, I, J
C     REAL A
      DOUBLE PRECISION A
      DO 1 I=1,N
       DO 2 J=1,N
        IF (I .EQ. J) THEN
          A(I,J)=1.
        ELSE
          A(I,J)=0.
        ENDIF
2      CONTINUE
1     CONTINUE
      RETURN
      END
C
C*****************************************************************
C*    This routine copies one matrix into another                 *
C*                                                                *
C*              A = B                                             *
C*****************************************************************
C
      SUBROUTINE MCOPY (A,B,N,M)
      DIMENSION A(N,M), B(N,M)
      INTEGER N,M,I,J
C     REAL A, B
      DOUBLE PRECISION A, B
      DO 1 I=1, N
       DO 2 J=1, M
        B(I,J)=A(I,J)
2      CONTINUE
1     CONTINUE
      RETURN
      END
C
C*****************************************************************
C*           A Square Matrix Routine                              *
C*                                                                *
C*         |  A1    A2  |                                         *
C*    A=   |            |    ;    Q=N+M                           *
C*         |_ A3    A4 _|                                         *
C*                                                                *
C*****************************************************************
C
      SUBROUTINE MCOMPACT (A,A1,A2,A3,A4,Q,N,M)
C
      INTEGER N,M,Q
      DOUBLE PRECISION    A(Q,Q),A1(N,N),A2(N,M),A3(M,N),A4(M,M)
      DO 1 I=1,N
       DO 2 J=1,N
        A(I,J)=A1(I,J)
2      CONTINUE
       DO 3 J=1,M
        A(I,N+J)=A2(I,J)
3      CONTINUE
1     CONTINUE
      DO 4 I=1,M
       DO 5 J=1,N
        A(I+N,J)=A3(I,J)
5      CONTINUE
       DO 6 J=1,M
        A(I+N,J+N)=A4(I,J)
6      CONTINUE
4     CONTINUE
```

```
      RETURN
      END
C
C****************************************************************
C*    A Non-Square Matrix Routine                                *
C*                                                               *
C*        |‾ A1 ‾|                                               *
C*    A = |      |    ;    Q=N+M                                 *
C*        |_ A2 _|                                               *
C*                                                               *
C****************************************************************
C
      SUBROUTINE VCOMPACT (A,A1,A2,Q,N,M,P)
C
      INTEGER N,M,P,Q
      DOUBLE PRECISION    A(Q,P),A1(N,P),A2(N,P)
      DO 1 I=1,N
       DO 2 J=1,P
        A(I,J)=A1(I,J)
2      CONTINUE
1     CONTINUE
      DO 4 I=1,M
       DO 5 J=1,P
        A(I+N,J)=A2(I,J)
5      CONTINUE
4     CONTINUE
      RETURN
      END
C
C****************************************************************
C*    A Diagonal Matrix Routine                                  *
C*                                                               *
C*        |‾ A1   NULL ‾|                                        *
C*    A=  |             |    ;    Q=N+M                          *
C*        |_ NULL   A2 _|                                        *
C*                                                               *
C****************************************************************
C
      SUBROUTINE DCOMPACT (A,A1,A2,Q,N,M)
C
      INTEGER N,M,Q
      DOUBLE PRECISION    A(Q,Q),A1(N,N),A2(M,M)
      DO 1 I=1,N
       DO 2 J=1,N
        A(I,J)=A1(I,J)
2      CONTINUE
       DO 3 J=1,M
        A(I,N+J)=0.0
3      CONTINUE
1     CONTINUE
      DO 4 I=1,M
       DO 5 J=1,N
        A(I+N,J)=0.0
5      CONTINUE
       DO 6 J=1,M
        A(I+N,J+N)=A2(I,J)
6      CONTINUE
4     CONTINUE
      RETURN
      END
C
C****************************************************************
C*    A Decomposed Square Matrix Routine                         *
C*                                                               *
C*        |‾ A1   A2 ‾|                                          *
C*    A=  |           |    ;    Q=N+M                            *
C*        |_ A3   A4 _|                                          *
C*                                                               *
C****************************************************************
C
      SUBROUTINE MDCOMP (A,A1,A2,A3,A4,Q,N,M)
```

```
C
      INTEGER N,M,Q
      DOUBLE PRECISION    A(Q,Q),A1(N,N),A2(N,M),A3(M,N),A4(M,M)
      DO 1 I=1,N
        DO 2 J=1,N
        A1(I,J)=A(I,J)
2       CONTINUE
        DO 3 J=1,M
        A2(I,J)=A(I,N+J)
3       CONTINUE
1     CONTINUE
      DO 4 I=1,M
        DO 5 J=1,N
        A3(I,J)=A(I+N,J)
5       CONTINUE
        DO 6 J=1,M
        A4(I,J)=A(I+N,J+N)
6       CONTINUE
4     CONTINUE
      RETURN
      END
C
C*****************************************************************
C*    A Decomposed Non-square Matrix Routine                     *
C*                                                               *
C*        |‾  A1  ‾|                                             *
C*    A = |        |    ;    Q=N+M                               *
C*        |_  A2  _|                                             *
C*                                                               *
C*****************************************************************
C
      SUBROUTINE VDCOMP (A,A1,A2,Q,N,M,P)
C
      INTEGER N,M,P,Q
      DOUBLE PRECISION    A(Q,P),A1(N,P),A2(N,P)
      DO 1 I=1,N
        DO 2 J=1,P
        A1(I,J)=A(I,J)
2       CONTINUE
1     CONTINUE
      DO 4 I=1,M
        DO 5 J=1,P
        A2(I,J)=A(I+N,J)
5       CONTINUE
4     CONTINUE
      RETURN
      END
C
C*****************************************************************
C*    A Decomposed Diagonal Matrix Routine                       *
C*                                                               *
C*       |‾  A1    NULL  ‾|                                      *
C*   A=  |                 |    ;    Q=N+M                       *
C*       |_  NULL    A2  _|                                      *
C*                                                               *
C*****************************************************************
C
      SUBROUTINE DDCOMP (A,A1,A2,Q,N,M)
C
      INTEGER N,M,Q
      DOUBLE PRECISION    A(Q,Q),A1(N,N),A2(M,M)
      DO 1 I=1,N
        DO 2 J=1,N
        A1(I,J)=A(I,J)
2       CONTINUE
1     CONTINUE
      DO 3 I=1,M
        DO 4 J=1,M
        A2(I,J)=A(I+N,J+N)
4       CONTINUE
3     CONTINUE
```

```
RETURN
END
C****************************************************************
```

What is claimed is:

1. A control system comprising:
   A. a linear continuous distributed parameter system, which, when excited by an input signal, produces both desired output responses and at least one undesired output response, which has a continuous distributed transfer function describable by a partial differential equation with respect to at least two independent variables, at least one of which is limited in length,
   B. a physical body which is so placed that it is subject to the undesired output response,
   C. means using a Moshfegh transform format for converting said continuous distributed transfer function of said system, said function describing the transfer between input signal and at least one undesired output response, into a digital distributed transfer function in a discrete format and for obtaining from the digital distributed transfer function a digital distributed state-space model of said system capable of use with a digital computer, said model being in the form of state-space equations,
   D. means for using said model and responsive to the input signal for deriving an optimal computed output signal representing a derived output response which is coincident in time and space with the undesired output response, equal in magnitude and opposite in phase, and
   E. transducer means responsive to the computed output signal for applying the derived output response to said body to cancel the effects of the desired output response.

2. A control system in accordance with claim 1, wherein the means for converting further comprises:
   A. means for converting the continuous distributed transfer function into Chester transform equations to obtain said digital distributed transfer function, and
   B. means for converting the Chester transform equations into said state-space model of said system.

3. A control system in accordance with claim 2, wherein the means for deriving an optimal computed output signal further comprises:
   A. means for deriving a plurality of possible computed output signals, and
   B. optimizing means for selecting the best one of the plurality of possible computed output signals to obtain the actual computed output signal.

4. A control system comprising:
   A. a linear continuous distributed parameter system, which, when excited by an input signal, produces both desired output responses and at least one undesired output response,
   B. a physical body which is so placed that it is subject to the undesired output response,
   C. means using a Moshfegh transform format for converting a continuous distributed model of the linear distributed system with at least two independent variables, at least one of which is limited in length, into a continuous distributed transfer function,
   D. means using a Chester transform format for converting the continuous distributed transfer function into a discrete distributed transfer function capable of use with a digital computer,
   E. means for converting the discrete distributed transfer function into a distributed state-space model of the linear distributed parameter system,
   F. means for using the distributed state-space model of the transfer function and responsive to the input signal for deriving a computed output signal representing a derived output response which is coincident in time and space with the undesired output response, equal in magnitude and opposite in phase, and
   G. transducer means responsive to the computed output signal for applying the derived output response to the physical body to cancel the effects of the undesired output response.

5. A control system in accordance with claim 4, wherein
   A. the continuous distributed transfer function is derived from equations having the form $$a\frac{\partial^2 y(x,t)}{\partial x^2} + b\frac{\partial^2 y(x,t)}{\partial x \partial t} + c\frac{\partial^2 y(x,t)}{\partial t^2} + d\frac{\partial y(x,t)}{\partial x} + e\frac{\partial y(x,t)}{\partial t} + fy(x,t) = gu(x,t)$$

and
   B. said state-space model has the form $$\begin{bmatrix} x^h(i+1,j) \\ x^v(i,j+1) \end{bmatrix} = \begin{bmatrix} A_1 & A_2 \\ A_3 & A_4 \end{bmatrix} \begin{bmatrix} x^h(i,j) \\ x^v(i,j) \end{bmatrix} + \begin{bmatrix} B_1 \\ B_2 \end{bmatrix} u(i,j)$$

$$y(i,j) = \begin{bmatrix} C_1 & C_2 \end{bmatrix} \begin{bmatrix} x^h(i,j) \\ x^v(i,j) \end{bmatrix} + D\, u(i,j).$$

6. A control system in accordance with claim 4, wherein the means for deriving a computed output signal further comprises:
   A. means for deriving a plurality of possible computed output signals, and
   B. optimizing means for selecting the best one of the plurality of possible computed output signals to obtain the actual computed output signal.

7. A control system in accordance with claim 6, wherein the plurality of possible computed output signals is represented by the expression y(i,j) for the derived output in the digital distributed state-space model equations $$\begin{bmatrix} x^h(i+1,j) \\ x^v(i,j+1) \end{bmatrix} = \begin{bmatrix} A_1 & A_2 \\ A_3 & A_4 \end{bmatrix} \begin{bmatrix} x^h(i,j) \\ x^v(i,j) \end{bmatrix} + \begin{bmatrix} B_1 \\ B_2 \end{bmatrix} u(i,j)$$

$$y(i,j) = \begin{bmatrix} C_1 & C_2 \end{bmatrix} \begin{bmatrix} x^h(i,j) \\ x^v(i,j) \end{bmatrix} + D\, u(i,j)$$

and wherein the equations for the best one of the plurality of possible output signals has been selected when the value of the expression u(i,j) is chosen as the optimum value $u^o(i,j)$, which is an optimum quartic controller in accordance with the control equation $$u^o(i,j) = -[G^h(i,j) \; G^v(i,j)] \begin{bmatrix} x^h(i,j) \\ x^v(i,j) \end{bmatrix}.$$

8. A control system comprising:
A. a linear continuous distributed parameter system, which, when excited by an input signal, produces both desired output responses and at least one undesired output response,
B. a physical body which is so placed that it is subject to the undesired output response,
C. means using a first transform format operating with both space and time as independent variables, wherein the space variable is limited in length, for converting a continuous distributed model of the linear distributed system into a continuous distributed transfer function,
D. means using a second transform format for converting the continuous distributed transfer function into a discrete distributed transfer function capable of use with a digital computer,
E. means for converting the discrete distributed transfer function into a distributed state-space model of the linear distributed parameter system,
F. means for using the distributed state-space model of the transfer function and responsive to the input signal for deriving a computed output signal representing a derived output response which is coincident in time and space with the undesired output response, equal in magnitude and opposite in phase, and
G. transducer means responsive to the computed output signal for applying the derived output response to the physical body to cancel the effects of the undesired output response, wherein the first transform format is mathematically in the nature of a Laplace transform and the second transform format is mathematically in the nature of a Z-transform format except that at least one of the variable dimensions each of the first transform format and of the second transform format are length-limited spatial dimensions in addition to the strictly time dimensions usually used in Laplace transforms and in z-transforms.

9. A control system comprising:
A. a linear continuous distributed parameter system, which, when excited by an input signal, produces both desired output responses and at least one undesired output response,
B. a physical body which is so placed that it is subject to the undesired output response,
C. means using a Moshfegh transform format for converting a continuous distributed model of the linear distributed system with at least two independent variables, at least one of which is limited in length, into a continuous distributed transfer function,
D. means using a Chester transform format for converting the continuous distributed transfer function into a discrete distributed transfer function capable of use with a digital computer,
E. means for converting the discrete distributed transfer function into a distributed state-space model of the linear distributed parameter system,
F. means for using the distributed state-space model of the transfer function and responsive to the input signal for deriving a computed output signal representing a derived output response which is coincident in time and space with the undesired output response, equal in magnitude and opposite in phase, and
G. transducer means responsive to the computed output signal for applying the derived output response to the physical body to cancel the effects of the undesired output response.

and wherein the means for deriving a computed output signal further comprises:
H. means for deriving a plurality of possible computed output signals, and
I. optimizing means for selecting the best one of the plurality of possible computed output signals to obtain the actual computed output signal, and wherein the plurality of possible computed output signals is represented by the expression y(i,j) for the derived output in the digital distributed state-space model equations $$\begin{bmatrix} x^h(i+1,j) \\ x^v(i,j+1) \end{bmatrix} = \begin{bmatrix} A_1 & A_2 \\ A_3 & A_4 \end{bmatrix} \begin{bmatrix} x^h(i,j) \\ x^v(i,j) \end{bmatrix} + \begin{bmatrix} B_1 \\ B_2 \end{bmatrix} u(i,j)$$

$$y(i,j) = [C_1 \quad C_2] \begin{bmatrix} x^h(i,j) \\ x^v(i,j) \end{bmatrix} + D \, u(i,j)$$

and wherein the equations for the best one of the plurality of possible output signals has been selected when the value of the expression u(i,j) is chosen as the optimum value $u^o(i,j)$, which is an optimum quartic controller in accordance with the control equation $$u^o(i,j) = -[G^h(i,j) \; G^v(i,j)] \begin{bmatrix} x^h(i,j) \\ x^v(i,j) \end{bmatrix}.$$

* * * * *